US012638934B2

(12) United States Patent
Jin et al.

(10) Patent No.: US 12,638,934 B2
(45) Date of Patent: May 26, 2026

(54) TOUCH INPUT DEVICE

(71) Applicant: HiDeep Inc., Seongnam-si (KR)

(72) Inventors: Myung Jun Jin, Seongnam-si (KR);
Young ho Cho, Seongnam-si (KR);
Seyeob Kim, Seongnam-si (KR);
Bonkee Kim, Seongnam-si (KR)

(73) Assignee: HiDeep Inc. (KR)

( * ) Notice: Subject to any disclaimer, the term of this
patent is extended or adjusted under 35
U.S.C. 154(b) by 0 days.

(21) Appl. No.: 18/770,242

(22) Filed: Jul. 11, 2024

(65) Prior Publication Data

US 2025/0021179 A1      Jan. 16, 2025

(30) Foreign Application Priority Data

Jul. 11, 2023      (KR) ......................... 10-2023-0089837

(51) Int. Cl.
*G06F 3/041*          (2006.01)
*G06F 3/044*          (2006.01)
(52) U.S. Cl.
CPC .......... G06F 3/0412 (2013.01); G06F 3/0446
(2019.05)
(58) Field of Classification Search
CPC .. G06F 3/0412; G06F 3/04166; G06F 3/0443;
G06F 3/0446; H10K 59/40
See application file for complete search history.

(56) References Cited

U.S. PATENT DOCUMENTS 12,008,200 B1 *   6/2024  Tan ..................... G06F 3/04184
2016/0313823 A1 * 10/2016  Tan ....................... G06F 3/0446

2018/0356927 A1 * 12/2018  Sasaki ................... G06F 3/0412
2021/0064212 A1 *  3/2021  Huang ................ G06F 3/04164
2021/0141474 A1    5/2021  Tanemura et al.
2022/0155937 A1 *  5/2022  Jo ........................ G06F 3/04184
2022/0326831 A1 * 10/2022  Lee ........................ G06F 3/0418

FOREIGN PATENT DOCUMENTS

KR         20140083653 A      7/2014
KR         20220141964 A      10/2022
KR           102499519 A1      2/2023

OTHER PUBLICATIONS

European Search Report 24181531.5, Issued Dec. 4, 2024.
Korean Office Action 10-2023-0089837, Issued Apr. 2, 2025.

* cited by examiner

*Primary Examiner* — Robin J Mishler
(74) *Attorney, Agent, or Firm* — The Belles Group, P.C.

(57)          ABSTRACT

A touch sensor includes a plurality of first electrodes and a
plurality of second electrodes, the first electrodes are
arranged in a first direction, and the second electrodes are
arranged in a second direction different from the first direc-
tion and include a second-a electrode pattern disposed
directly adjacent to the first electrode and a second-b elec-
trode pattern spaced a predetermined distance from the first
electrode. A control unit matches a plurality of codes that are
programmed by a built-in firmware with a plurality of
addresses, respectively, and store the matched codes in a
codebook table, receives the plurality of stored codes
according to a scan mode to generate a driving signal and
output the generated driving signal to the plurality of second
electrodes, and receives a sensing signal output from the
plurality of first electrodes to detect a touch position of an
object disposed on the touch sensor.

13 Claims, 24 Drawing Sheets

【FIG. 1】
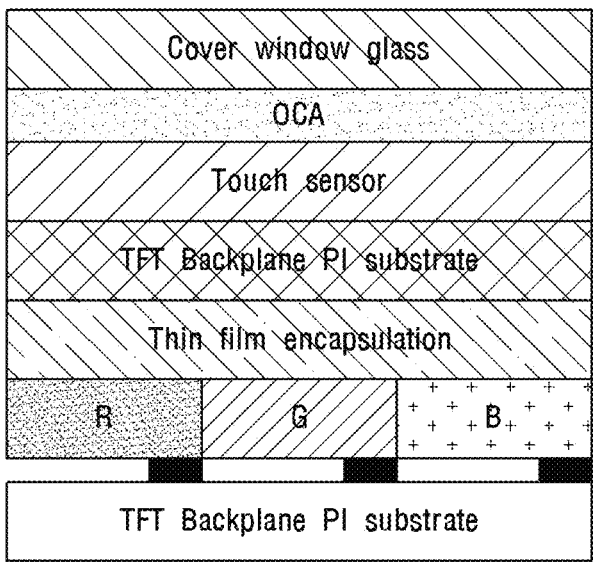

【FIG. 2】
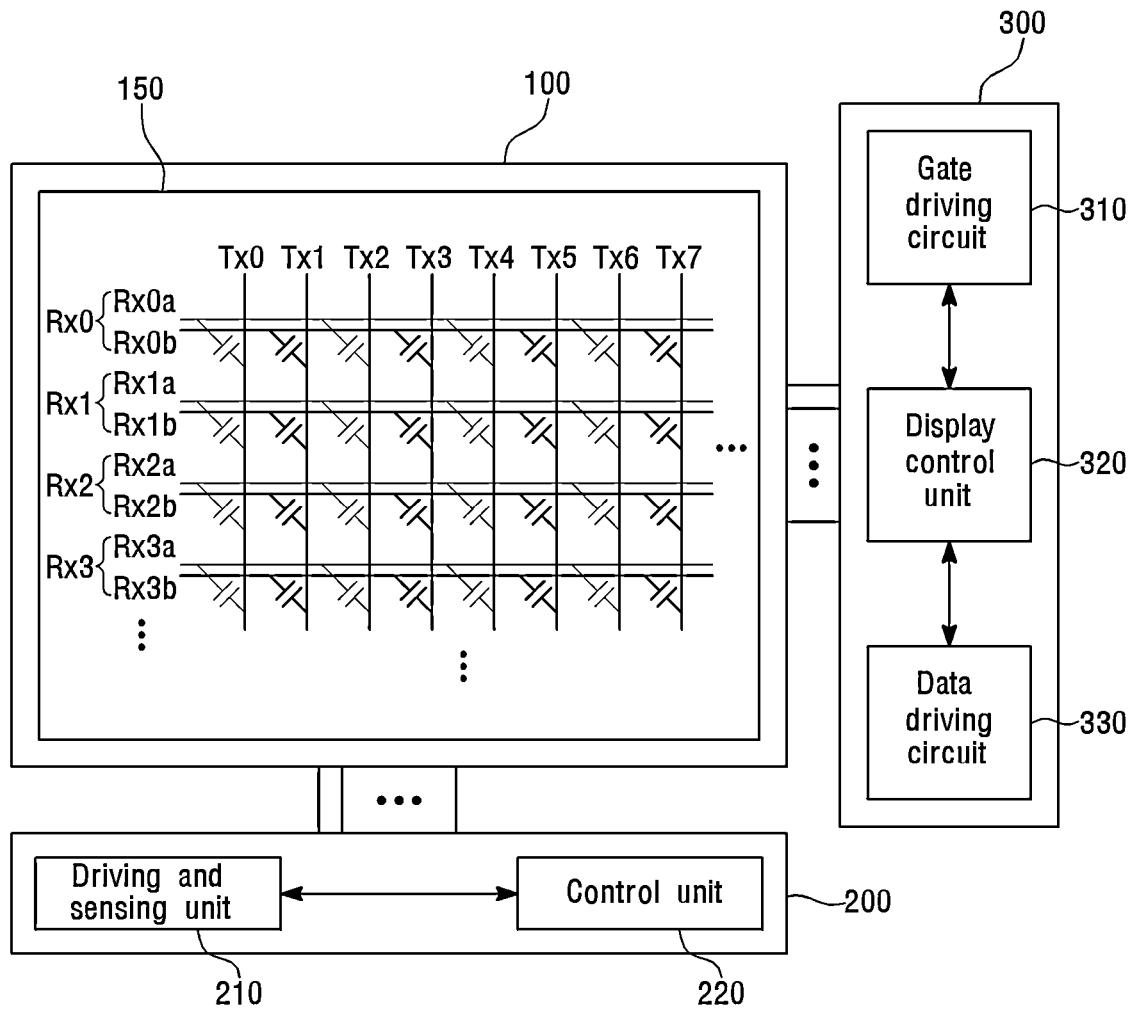

[FIG. 3]
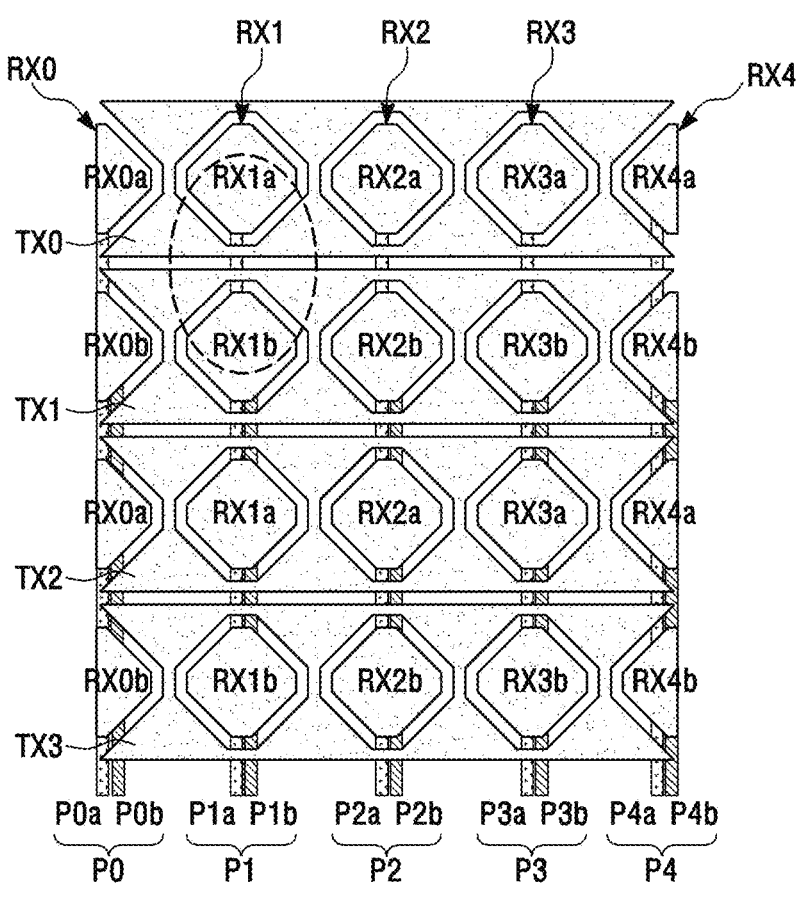

【FIG. 4】
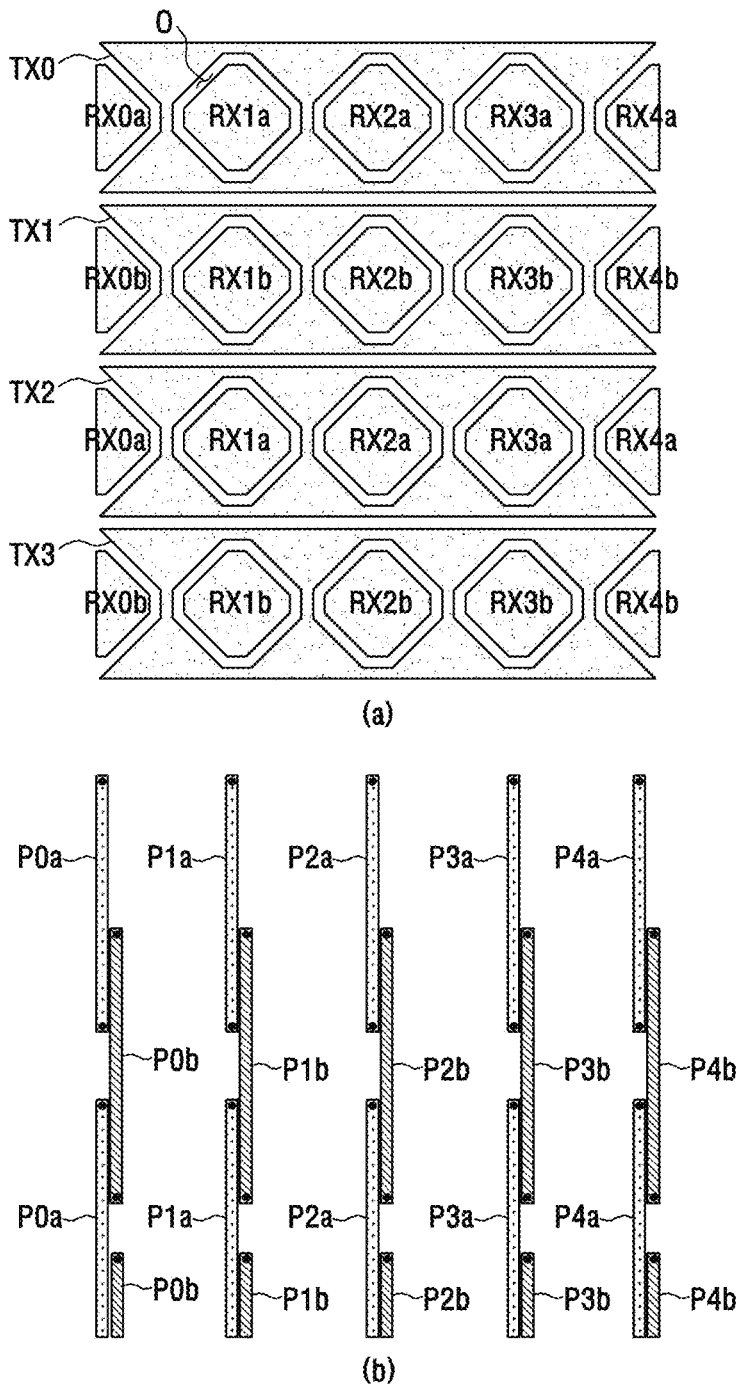

[FIG. 5]
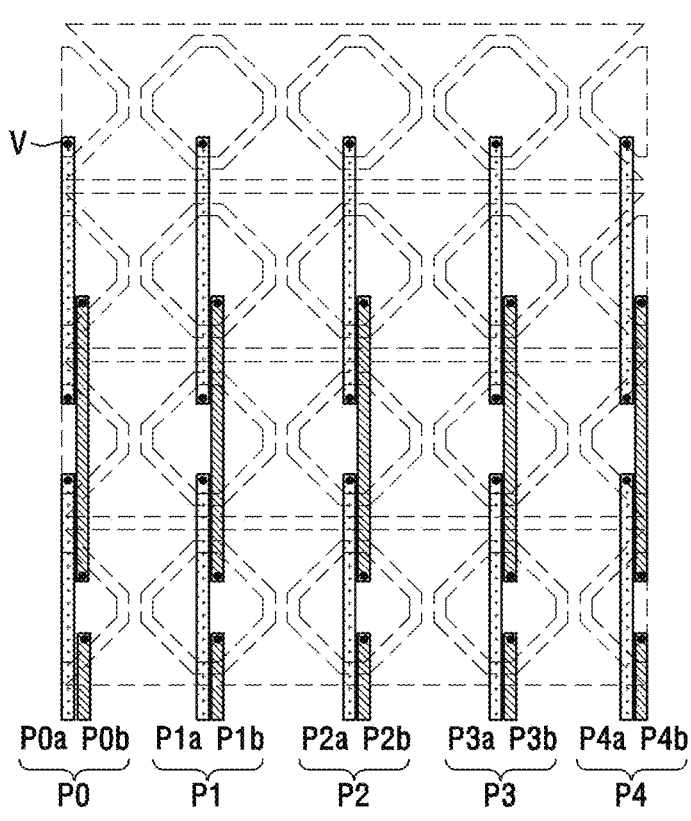

[FIG. 6]
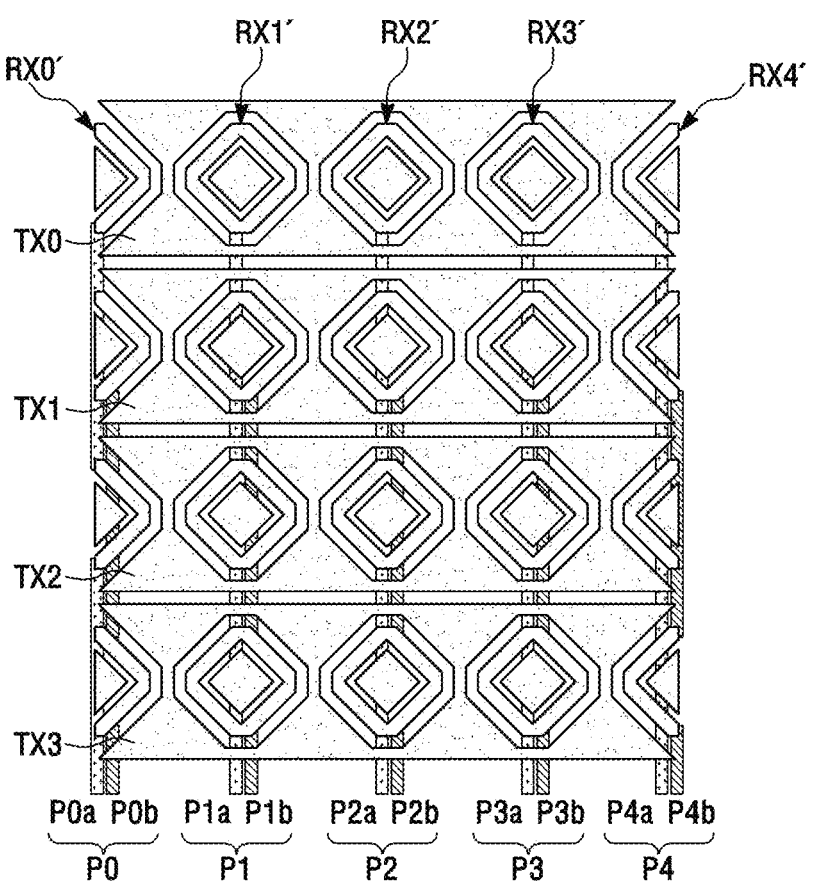

【FIG. 7】
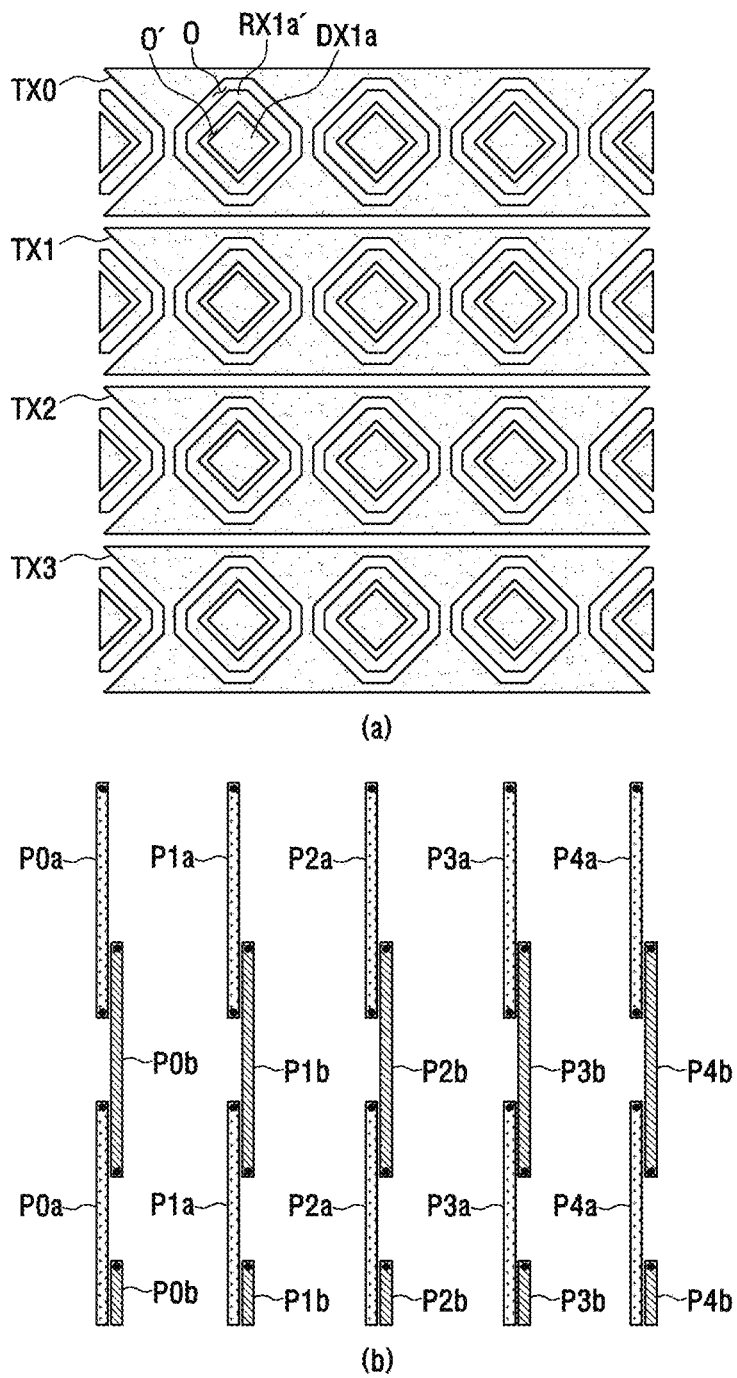
(a)
(b)

[FIG. 8]
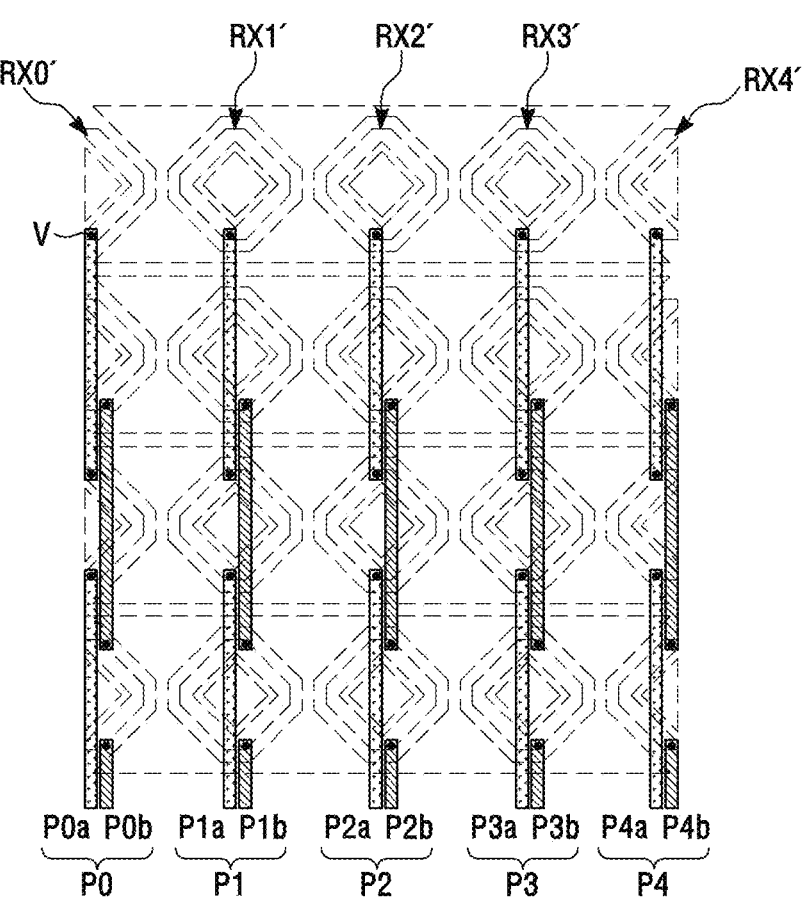

【FIG. 9】
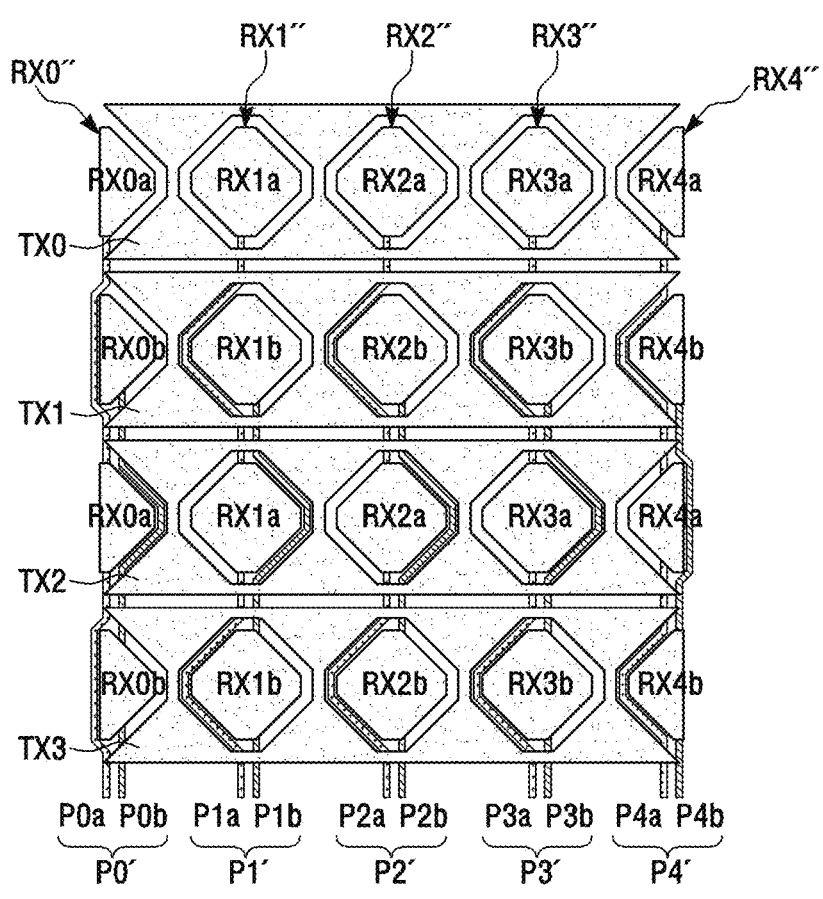

【FIG. 10】
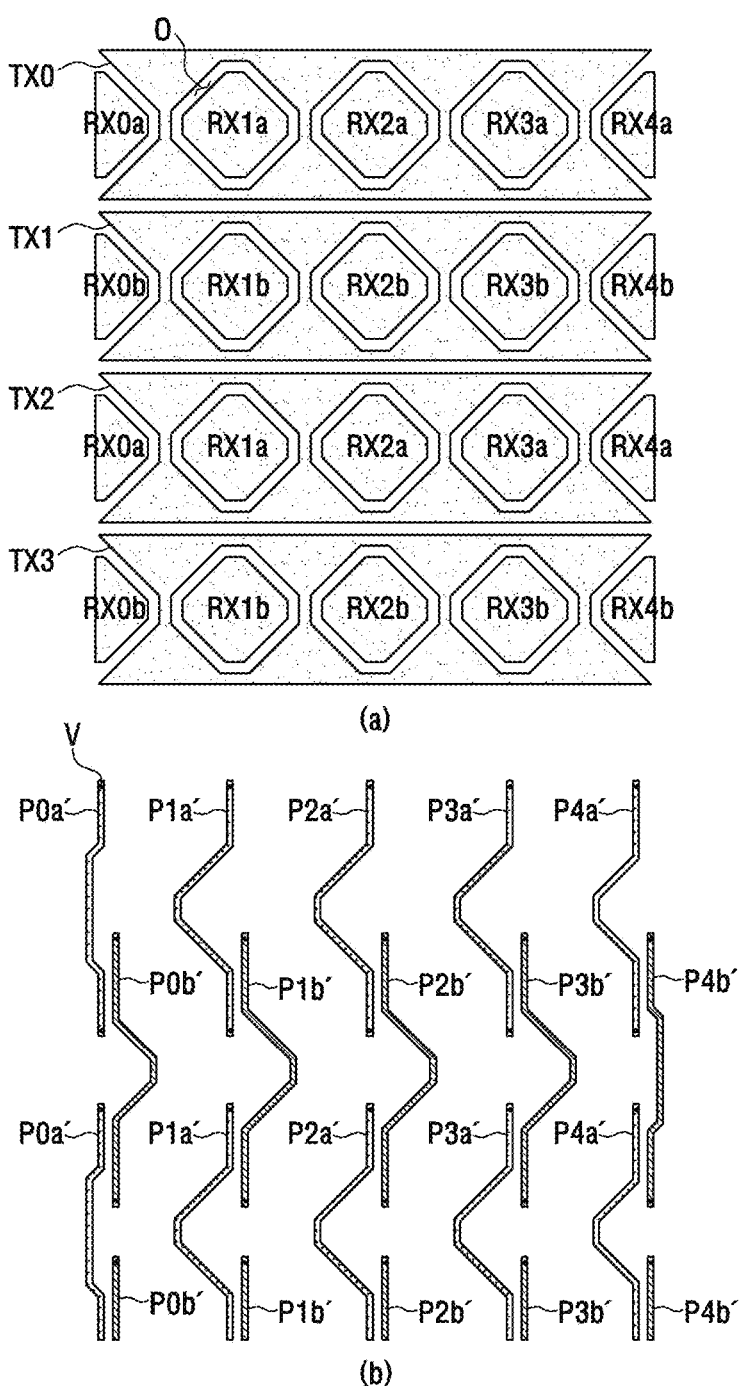
(a)
(b)

【FIG. 11】
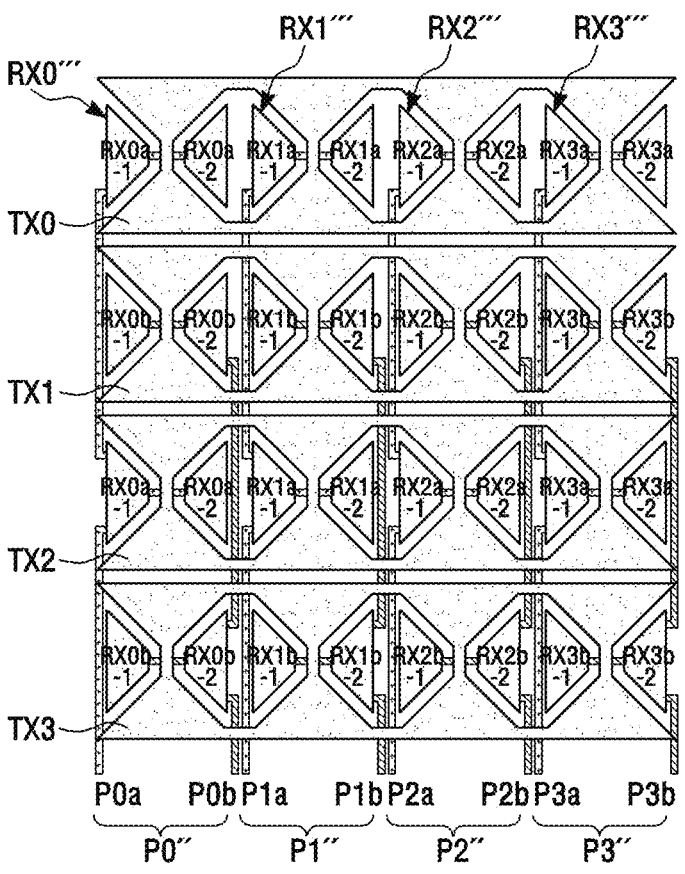

【FIG. 12】
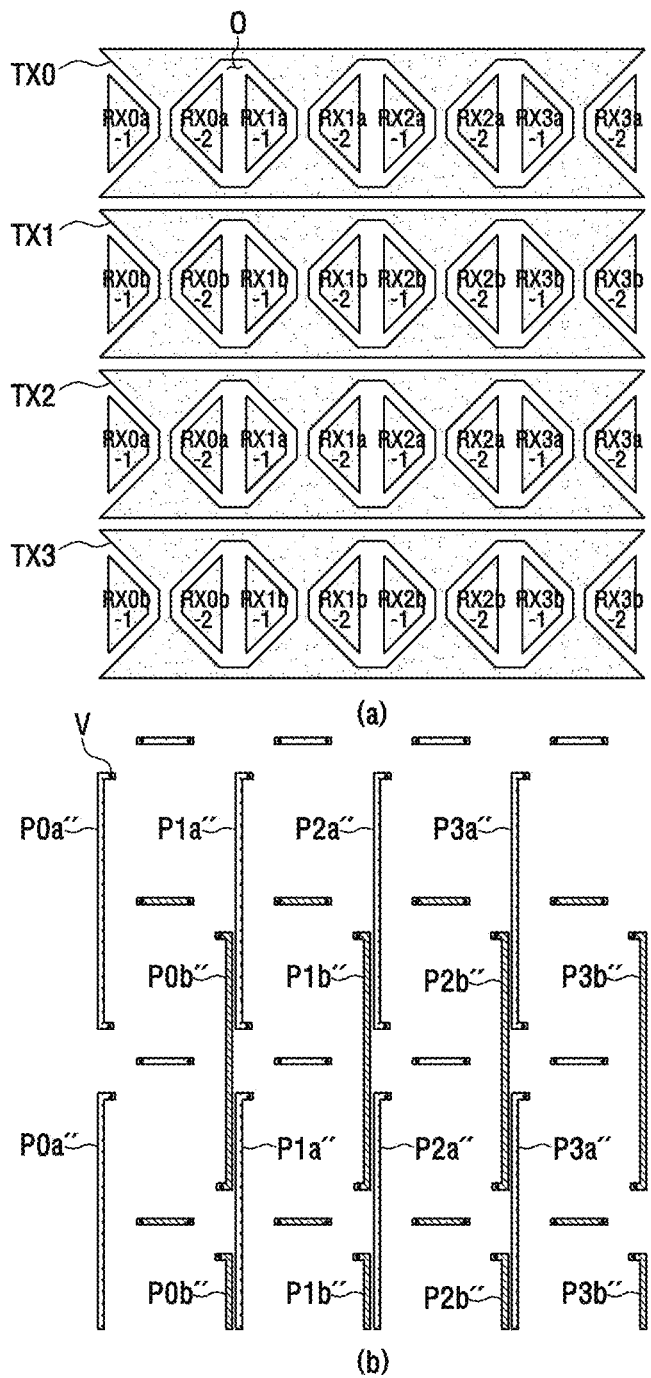
(a)
(b)

【FIG. 13】
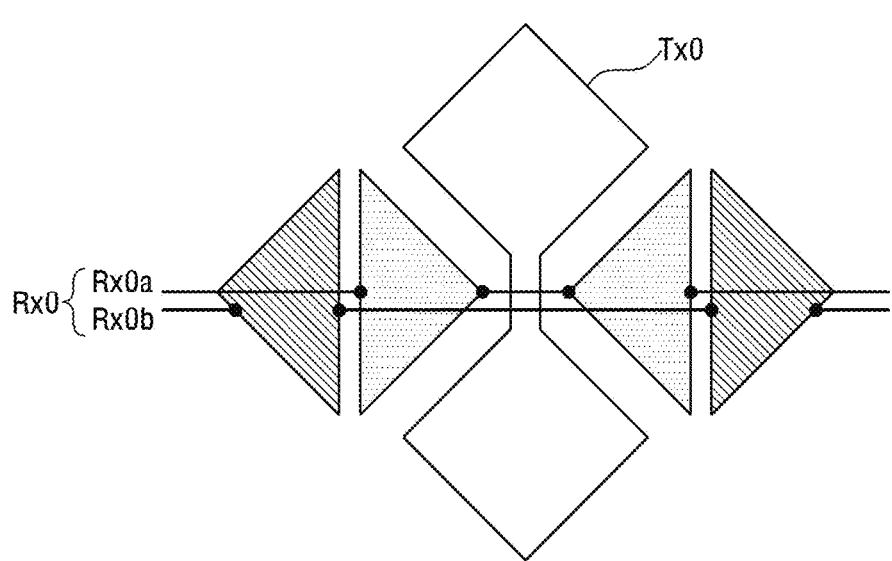

[FIG. 14]
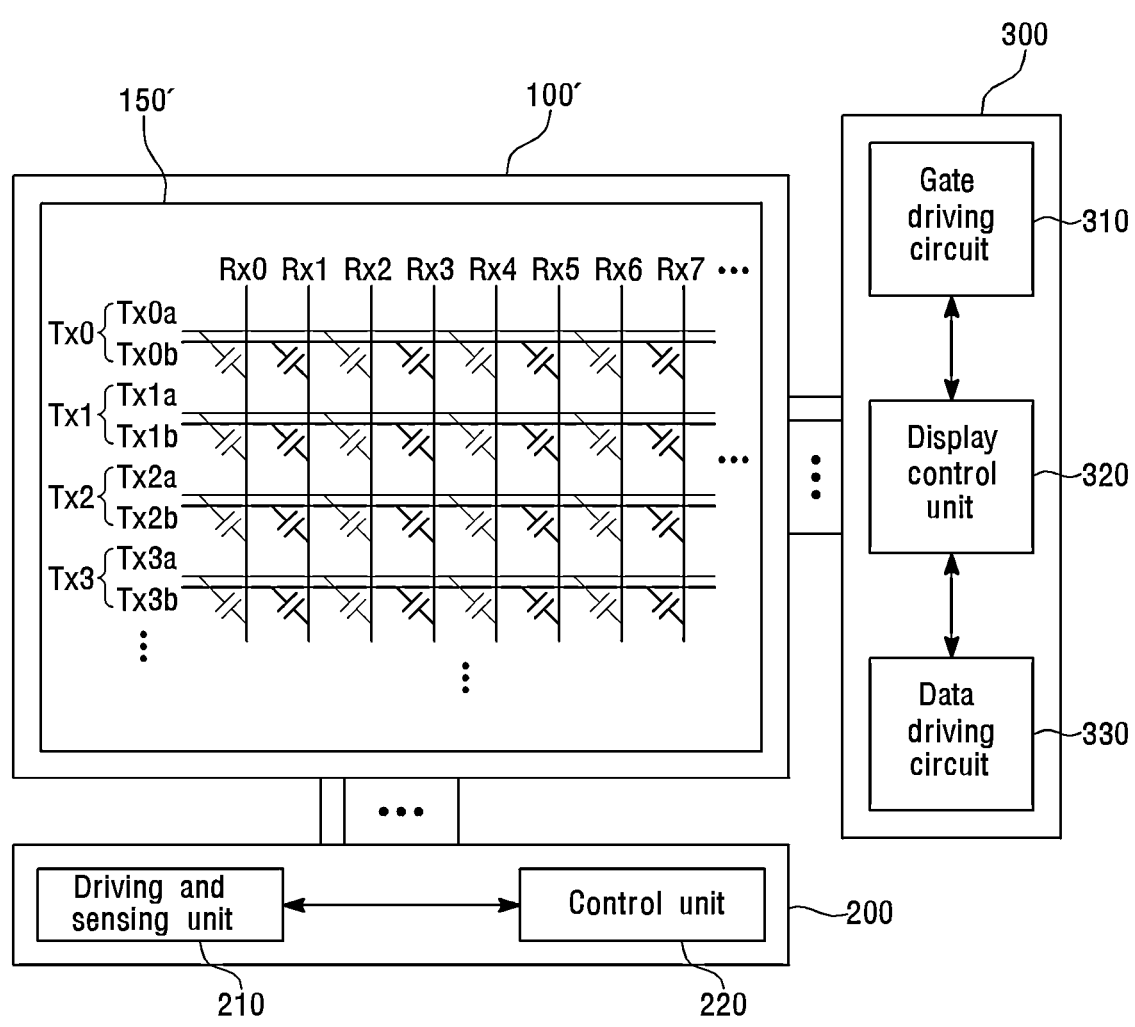

【FIG. 15】
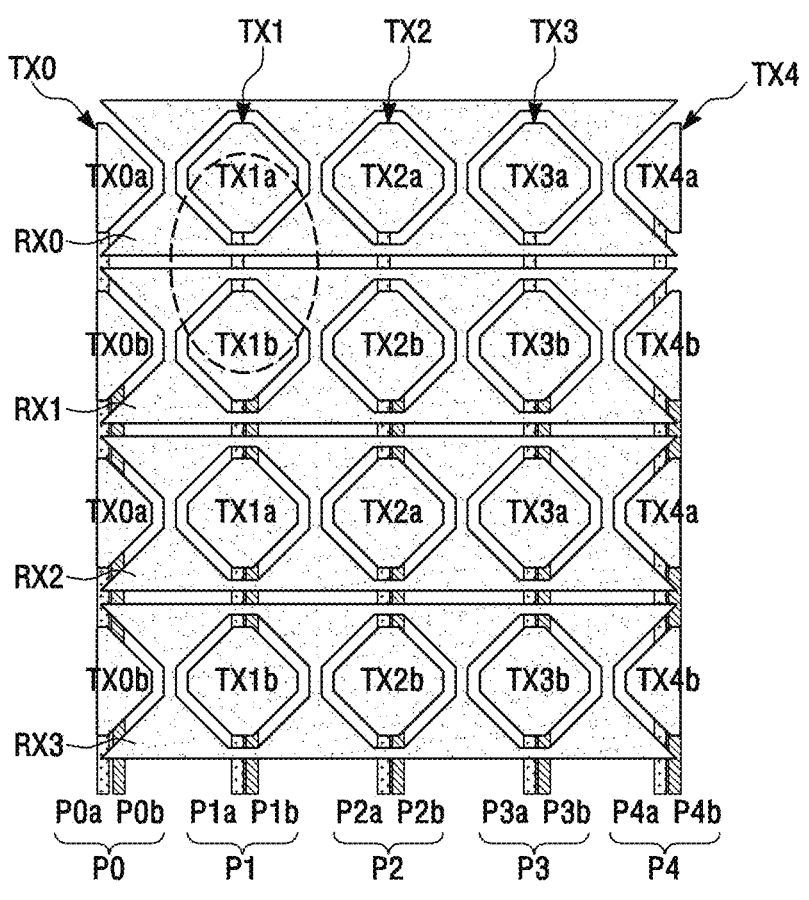

【FIG. 16】
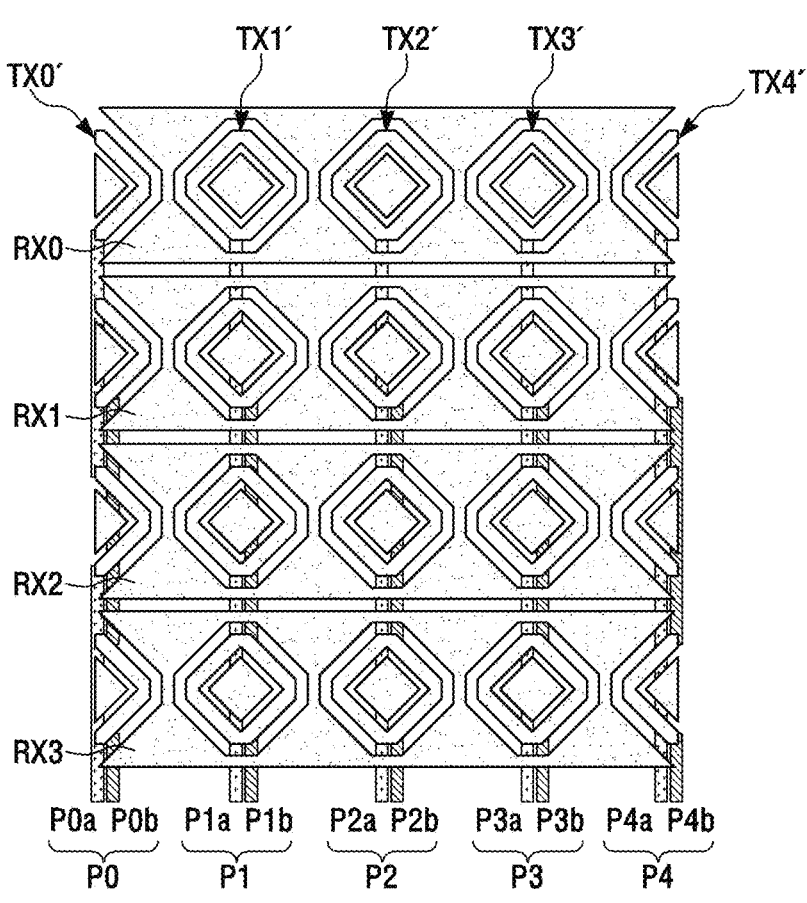

【FIG. 17】
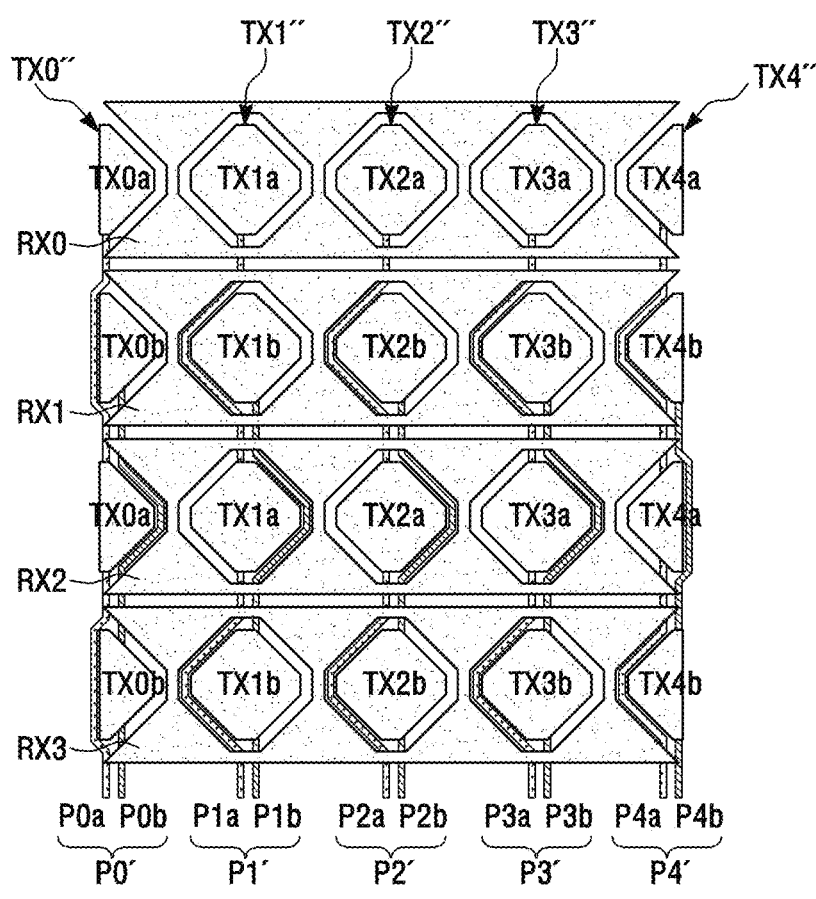

[FIG. 18]
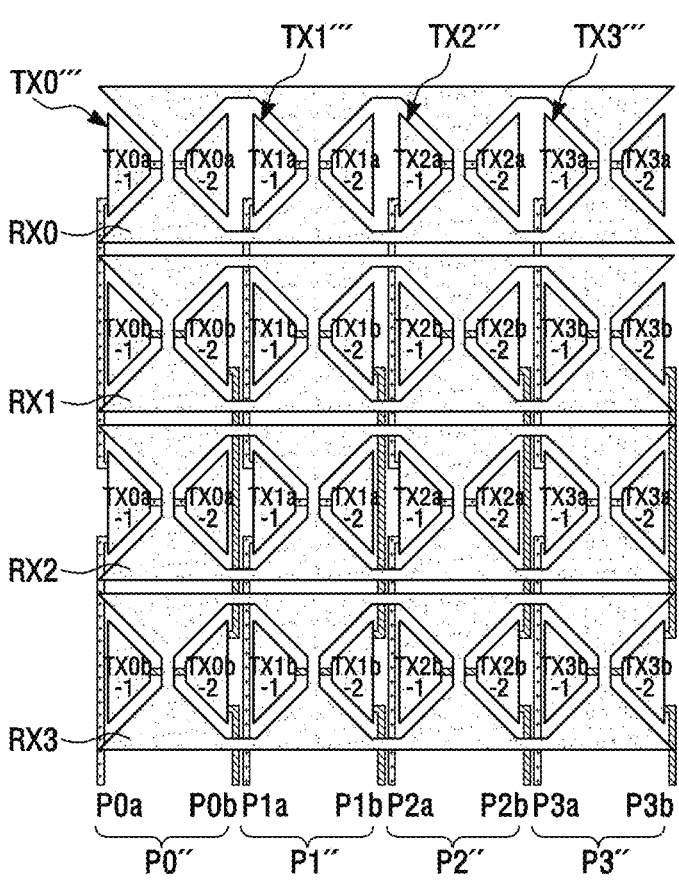

[FIG. 19]
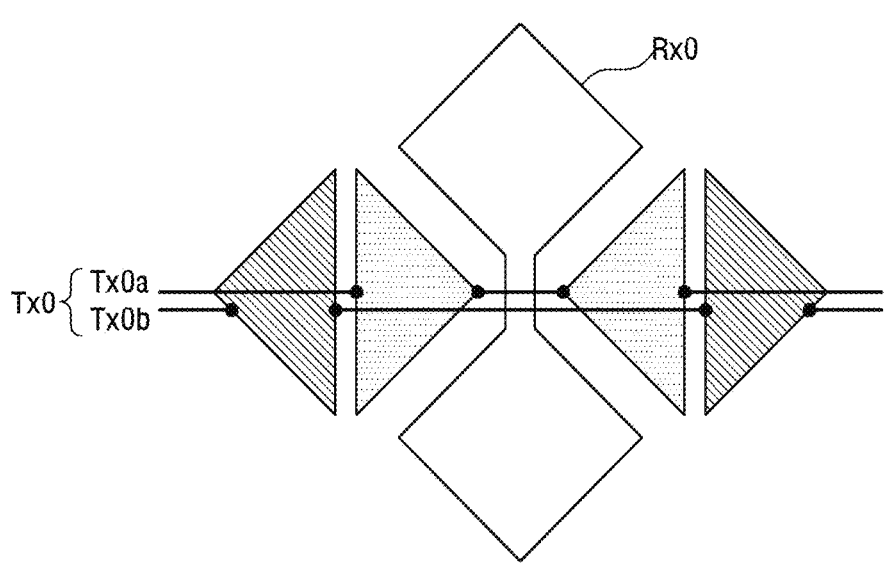

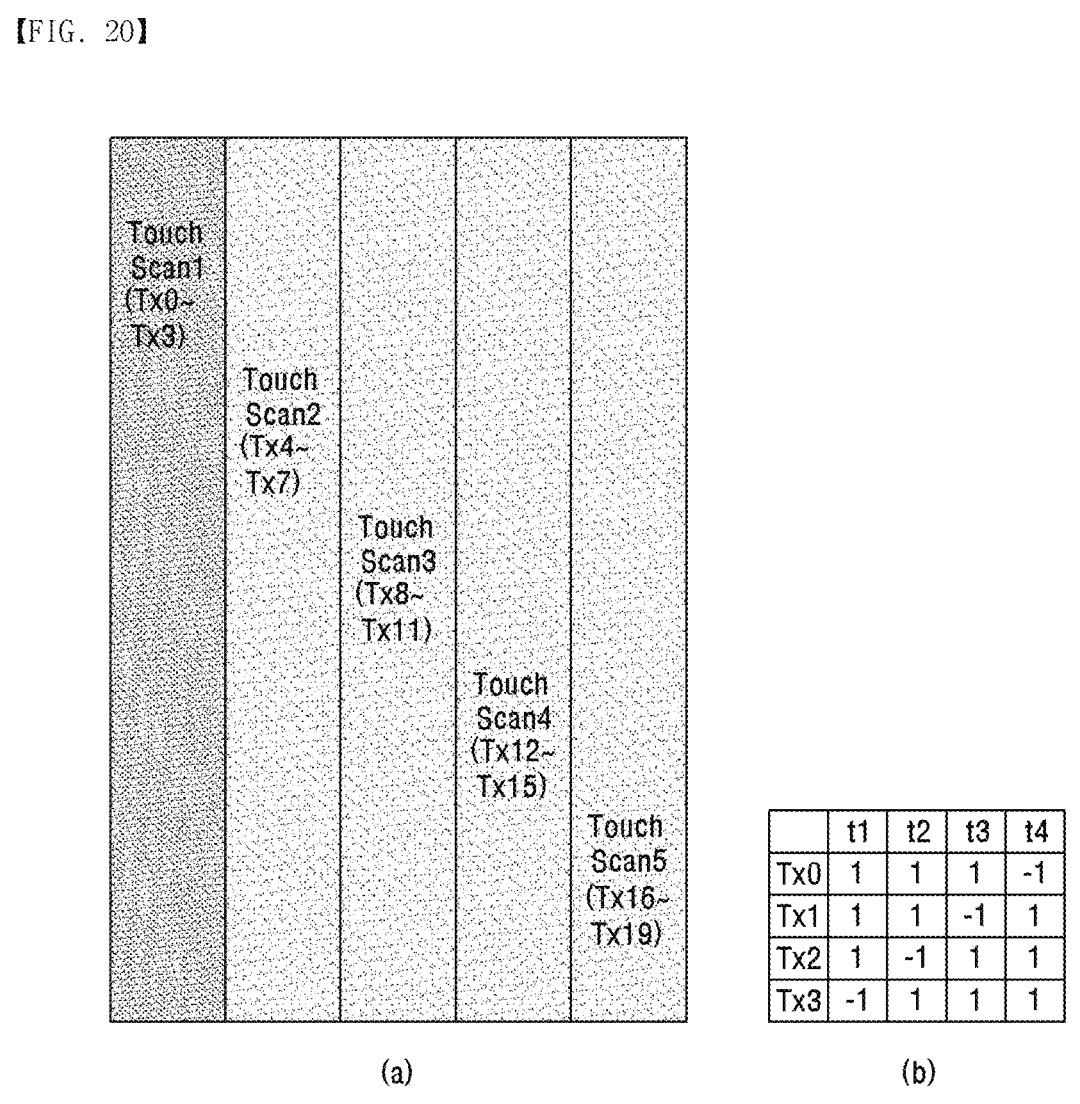

【FIG. 20】

|     | t1 | t2 | t3 | t4 |
|-----|----|----|----|----|
| Tx0 | 1  | 1  | 1  | -1 |
| Tx1 | 1  | 1  | -1 | 1  |
| Tx2 | 1  | -1 | 1  | 1  |
| Tx3 | -1 | 1  | 1  | 1  |

(a)                                    (b)

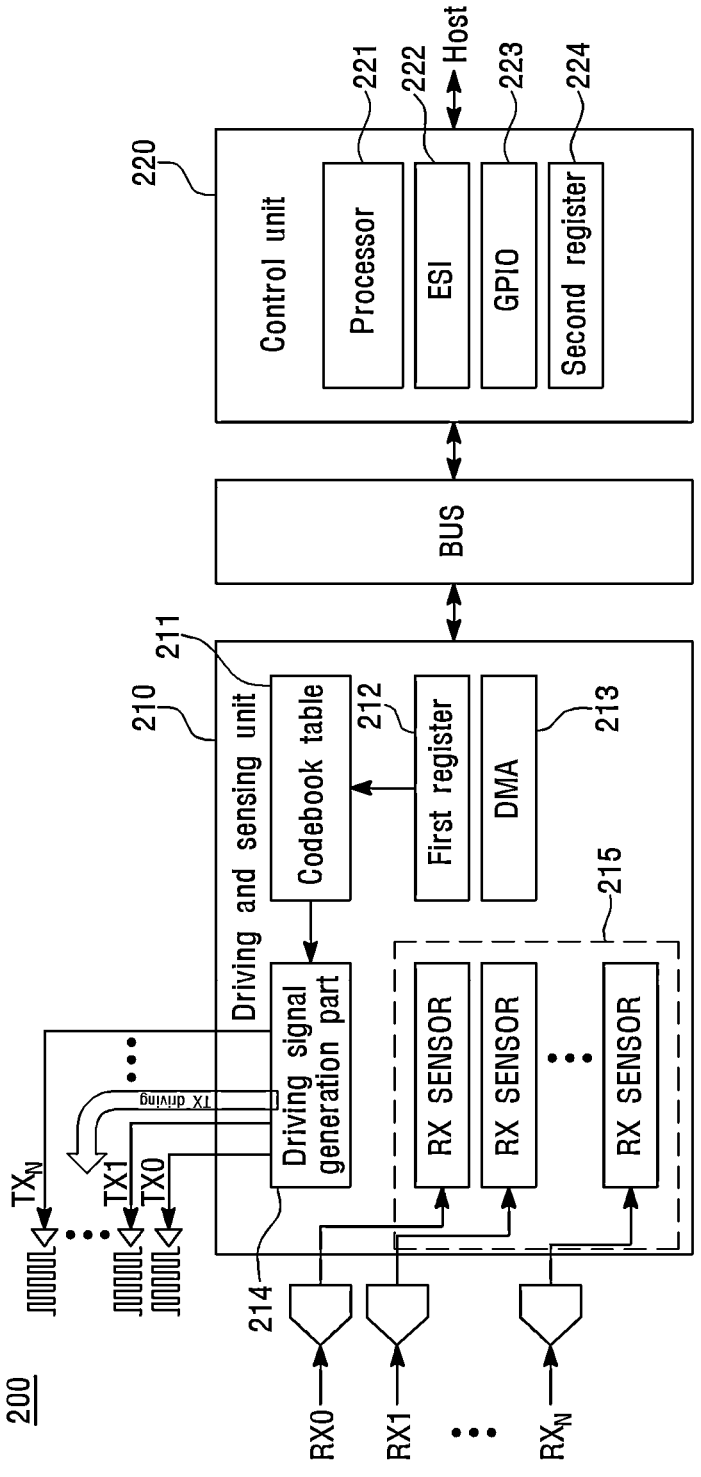
[FIG. 21]

【FIG. 22】
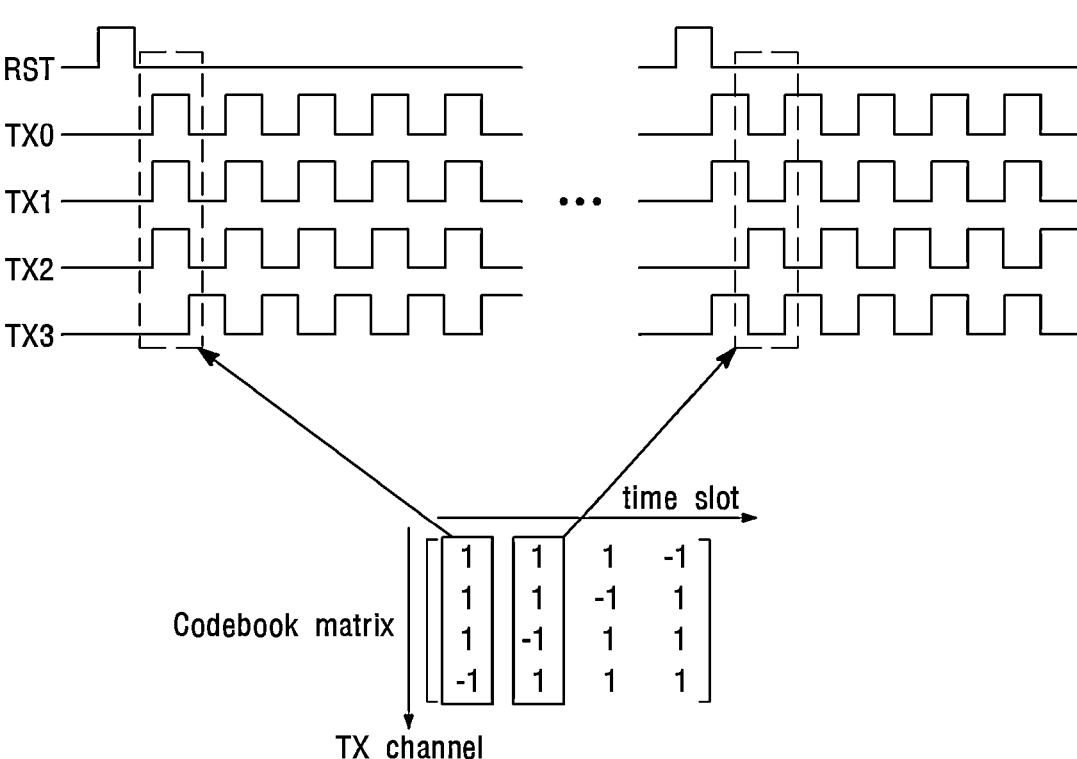

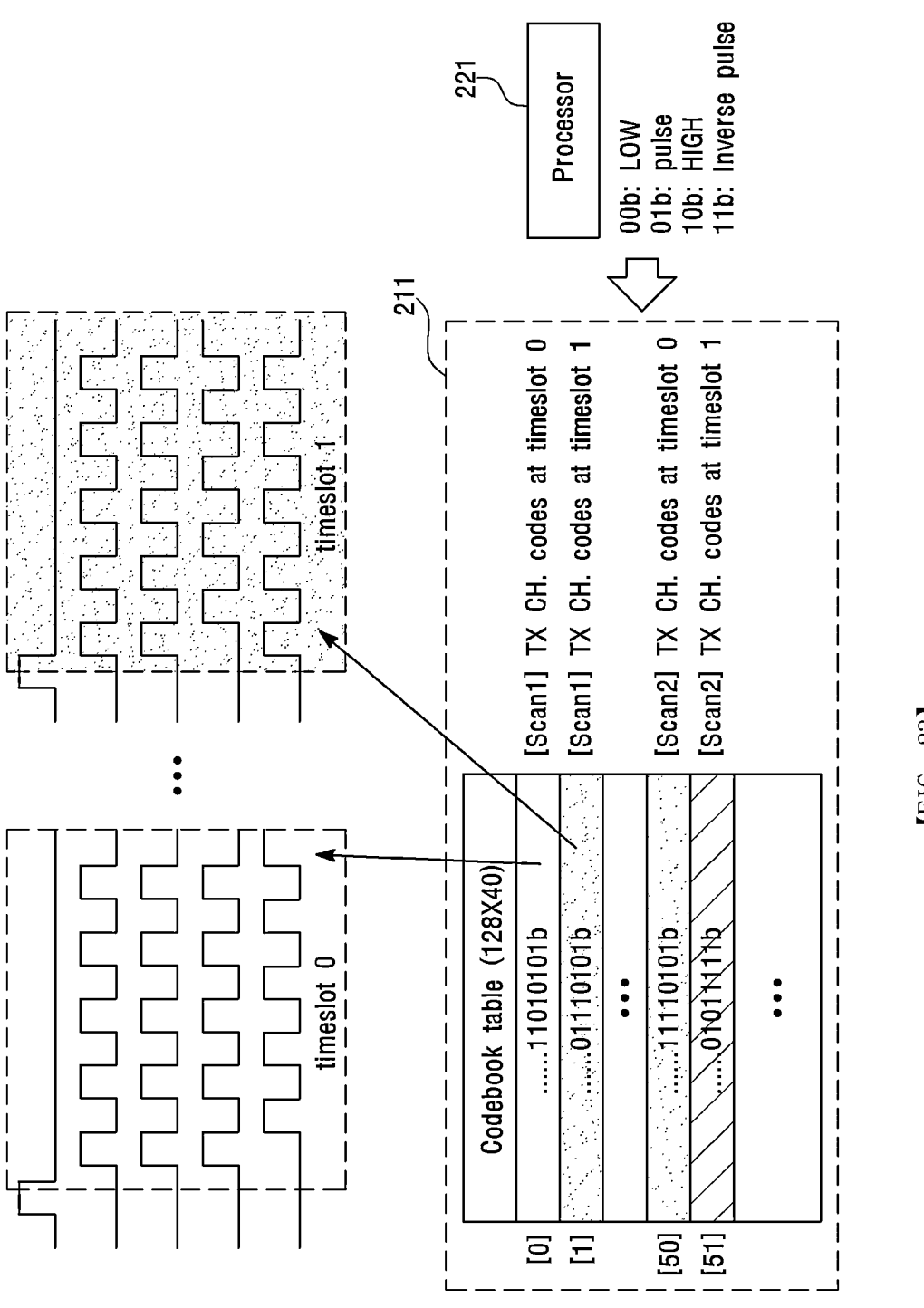
[FIG. 23]

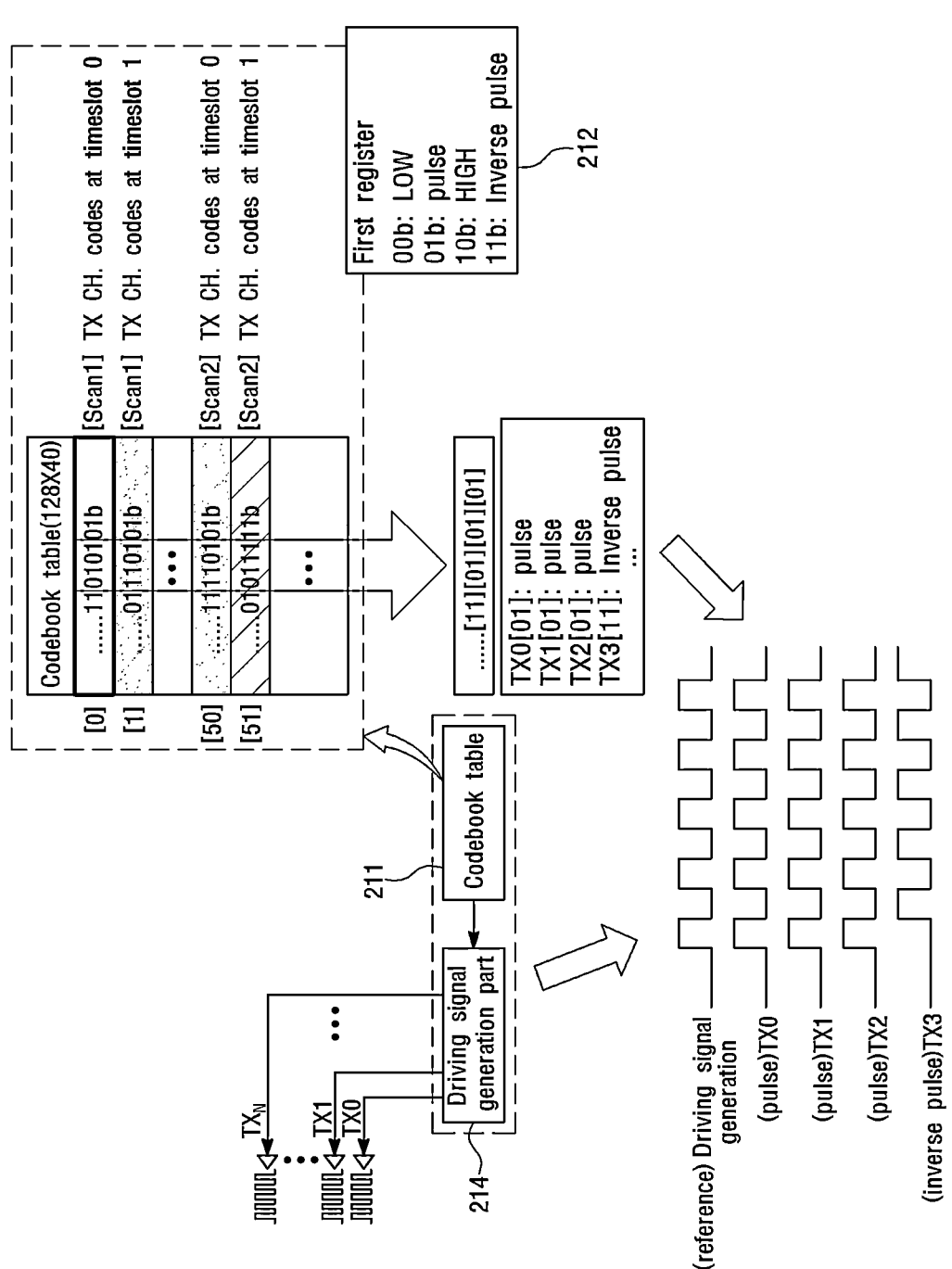
[FIG. 24]

TOUCH INPUT DEVICE

CROSS-REFERENCE TO RELATED APPLICATIONS

This U.S. Non-Provisional Patent Application claims priority under 35 USC § 119 of Korean Patent Application No. 10-2023-0089837, filed on Jul. 11, 2023, the entire contents of which are hereby incorporated by reference herein, for all purposes.

BACKGROUND

The present disclosure relates to a touch input device, and more particularly, to a touch input device including a touch controller capable of sensing various touches by storing, in advance, various code values in a codebook according to a touch scan mode in the touch input device.

Various kinds of input devices are used to operate a computing system. For example, the input devices such as a button, a key, a joystick, and a touch screen are being used. Since the touch screen is easily and simply operated, the touch screen is increasingly used when operating the computing system.

A touch sensor that is one kind of information input devices may be provided in a display panel. For example, the touch sensor may be attached to one surface of the display panel or integrated with the display panel. A user may input information by touching the touch sensor while watching an image displayed on a screen of the display panel.

FIG. 1 is a schematic view illustrating a laminated structure of a typical OCTA method.

The OCTA that is one kind of touch screen panel technologies stands for On Cell Touch AMOLED and is one kind of touch screen panels (TSP) obtained by directly depositing the touch sensor on an AMOLED display cell as illustrated in FIG. 1.

That is, the OCTA is a technology of applying a touch screen function of a smartphone/tablet into an OLED panel. Since no tempered glass is used between the cell and the touch sensor, clarity is improved compared with a typical general TSP.

Y-OCTA is a touch screen panel obtained by directly depositing the touch sensor on the cell. The Y-OCTA is named by adding Y of 'YOUM' that is a brand name of Samsung display flexible OLED to the 'OCTA'.

The Y-OCTA technology is applied to a thin film encapsulation (TFE) process among OLED manufacturing processes. The touch screen is realized by patterning an aluminum metal mesh sensor used as the touch sensor between a polarizer and an organic material for thin film encapsulation.

The Y-OCTA may resolve a visibility limitation occurring at a curved edge by attaching the polarizer closely to a cover window. Also, costs may be reduced by removing a support film to reduce a thickness of the panel and by omitting a laminating process.

A touch input device including the typical Y-OCTA touch screen panel has a limitation in a low ground mass (LGM) situation. The limitation is a phenomenon in which a signal that is normally detected by the touch input device is disappeared or a signal is split and detected at two or more points, when a predetermined touch occurs in a state (floating state) in which a user does not hold, by hands, the touch input device to which the touch sensor is mounted, in case of realizing a driving electrode and a receiving electrode of the touch sensor as a single layer or a double layer.

On the other hand, a codebook that is an indexed collection, in which predetermined sign vectors are collected for encoding and/or decoding of data, is used to identify a sufficiently large number of various patterns.

In a typical touch input device, when the codebook is not used in a driving and sensing unit, there is a limitation in that a user is unable to create a desired code form or only a fixed code form is used.

When firmware is intervened to resolve this limitation, additional firmware calculations are required whenever a code change is required or whenever driven.

In this case, as a processor such as a central processing unit (CPU) is inevitably intervened, there is a limitation in that a touch driving and a sensing time of the touch input device increases.

Also, there is a limitation in that an operation efficiency is degraded because the central processing unit is required to operate frequently during the code change and does not perform other operations such as noise filter algorithm performances or coordinate calculations, which causes reduction in reporting rate or increase in power consumption.

SUMMARY

The present invention provides a touch input device capable of preventing a phenomenon in which a touch driving and a sensing time increase due to additional firmware calculations of a processor for each driving of the touch input device and preventing reduction in operation efficiency and increase in power consumption.

An embodiment of the present invention provides a touch input device including: a touch sensor; and a control unit configured to control the touch sensor. Here, the touch sensor includes a plurality of first electrodes and a plurality of second electrodes, the first electrodes are arranged in a first direction, and the second electrodes are arranged in a second direction different from the first direction and include a second-a electrode pattern disposed directly adjacent to the first electrode and a second-b electrode pattern spaced a predetermined distance from the first electrode instead of being directly adjacent thereto. Also, the control unit matches a plurality of codes that are programmed by a built-in firmware with a plurality of addresses, respectively, and store the matched codes in a codebook table, receives the plurality of stored codes according to a scan mode to generate a driving signal and output the generated driving signal to the plurality of second electrodes, and receives a sensing signal output from the plurality of first electrodes to detect a touch position of an object disposed on the touch sensor.

In an embodiment, the plurality of first electrodes may be arranged in a direction perpendicular to the plurality of second electrodes.

In an embodiment, the touch input device may further include a touch controller configured to store a plurality of codes in advance and output a predetermined code among the plurality of codes to the plurality of second electrodes according to a touch scan.

In an embodiment, the touch controller may include: the control unit configured to perform the touch scan so that driving signals are applied to at least two second electrodes among the plurality of second electrodes; and a driving and sensing unit configured to match the predetermined code with the at least two second electrodes in response to control of the control unit according to the touch scan and output the matched predetermined code.

In an embodiment, the driving and sensing unit may include: a codebook table configured to match the plurality of codes programmed by the built-in firmware in the control unit with the plurality of addresses, respectively, and store the plurality of matched codes; a driving signal generation part configured to receive the plurality of stored codes according to the scan mode to generate a driving signal and output the generated driving signal to the plurality of second electrodes; and a plurality of sensing sensors configured to receive a sensing signal output from the plurality of first electrodes.

In an embodiment of the present invention, a touch input device includes: a display panel including a plurality of scan lines; a touch sensor including a plurality of driving electrodes and a plurality of receiving electrodes arranged in a direction perpendicular to the plurality of driving electrodes; and a touch controller configured to store a plurality of codes in advance and output a predetermined code among the plurality of codes to the plurality of second electrodes according to a touch scan.

In an embodiment, the touch controller may include: a control unit configured to perform the touch scan so that driving signals are applied to two or more driving electrodes of the plurality of driving electrodes; and a driving and sensing unit configured to match the predetermined code with the at least two second electrodes in response to control of the control unit according to the touch scan and output the matched predetermined code.

In an embodiment, the driving and sensing unit may include: a codebook table configured to match the plurality of codes programmed by the built-in firmware in the control unit with the plurality of addresses, respectively, and store the plurality of matched codes; a driving signal generation part configured to receive the plurality of stored codes according to a scan mode to generate a driving signal and output the generated driving signal to the plurality of driving electrodes; and a plurality of sensing sensors configured to receive a sensing signal output from the plurality of receiving electrodes.

In an embodiment, the driving and sensing unit may further include a first register configured to receive the plurality of addresses and data matched with the respective addresses from the codebook table and temporarily store the received addresses and data.

In an embodiment, the control unit may include: a processor configured to set a start codebook address when scanning is performed according to a scan mode through the firmware and program the plurality of codes; an external serial interface configured to transmit data calculated by the processor to a host; and a second register configured to temporarily store data input or output through a general-purpose input/output part.

In an embodiment, the control unit may sequentially perform the touch scan multiple times on all of the plurality of driving electrodes.

In an embodiment, each of the driving signals may be obtained by continuing a vector value expressed by at least one of −1, 0, and 1 for each predetermined time period as many as the number of the driving electrodes.

In an embodiment, the processor may read a corresponding code from the codebook table whenever the driving and sensing unit performs a touch driving and increase a codebook address for each time slot.

In an embodiment, the touch input device may further include: a gate driving circuit configured to sequentially output display scan signals to the plurality of scan lines to control a driving timing of a plurality of subpixels; a data driving circuit configured to receive image data and convert the image data into an analog data voltage; and a display control unit configured to transmit the image data and control the gate driving circuit and the data driving circuit.

In an embodiment, the display panel may further include a plurality of data lines arranged in a direction perpendicular to the plurality of scan lines, and the plurality of subpixels are disposed on an area in which the plurality of scan lines cross the plurality of data lines.

In an embodiment, the data driving circuit may output a data voltage to each of the plurality of data lines in accordance with a timing at which a scan signal is applied through the plurality of scan lines and control each of the plurality of subpixels to display brightness according to the image data.

In an embodiment, the codebook table may be a table in which code vectors for encoding and decoding of data stored in an internal or external memory or register of the touch controller.

According to the present invention, the single touch controller may perform various touch sensings by storing various code values in advance in the codebook according to the touch scan mode in the touch input device.

Accordingly, the touch driving time and sensing time of the touch input device may be reduced without performing additional firmware calculations whenever the code change is required or whenever the touch input device performs the touch driving.

Particularly, since the central processing unit may perform other important operations during the code change, the operation efficiency of the central processing unit may increase, the power consumption may be saved, and the decrease phenomenon of the reporting rate may be prevented.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 1 is a schematic view illustrating a laminated structure of a typical OCTA method;

FIG. 2 is a block diagram illustrating a touch input device according to a first embodiment of the present invention;

FIG. 3 is a plan view illustrating a portion of an embodiment of a touch sensor 150 in FIG. 2;

FIG. 4 is plan views illustrating a state in which the touch sensor in FIG. 3 is separated by layers;

FIG. 5 is a view for explaining electrical connection of a plurality of receiving electrodes in FIG. 4;

FIG. 6 is a plan view illustrating a portion of another embodiment of the touch sensor 150 in FIG. 2;

FIG. 7 is plan views illustrating a state in which the touch sensor in FIG. 6 is separated by layers;

FIG. 8 is a view for explaining electrical connection of a plurality of receiving electrodes in FIG. 6;

FIG. 9 is a plan view illustrating a portion of another embodiment of the touch sensor 150 in FIG. 2;

FIG. 10 is plan views illustrating a state in which the touch sensor in FIG. 9 is separated by layers;

FIG. 11 is a plan view illustrating a portion of another embodiment of the touch sensor 150 in FIG. 2;

FIG. 12 is plan views illustrating a state in which the touch sensor in FIG. 11 is separated by layers;

FIG. 13 is a plan view illustrating a portion of another embodiment of the touch sensor 150 in FIG. 2;

FIG. 14 is a block diagram illustrating a touch input device according to a second embodiment of the present invention;

FIG. 15 is a plan view illustrating a portion of an embodiment of a touch sensor 150' in FIG. 13;

FIG. 16 is a plan view illustrating a portion of another embodiment of the touch sensor 150' in FIG. 14;

FIG. 17 is a plan view illustrating a portion of another embodiment of the touch sensor 150' in FIG. 14;

FIG. 18 is a plan view illustrating a portion of another embodiment of the touch sensor 150' in FIG. 14;

FIG. 19 is a plan view illustrating a portion of another embodiment of the touch sensor 150' in FIG. 14;

(a) and (b) of FIG. 20 are views for explaining multi-driving of the touch sensor 150 in FIG. 2;

FIG. 21 is a block diagram illustrating a touch controller in the touch input device in FIG. 2.

FIG. 22 is a view illustrating an output waveform of a driving signal generation part in the driving and sensing unit in FIG. 21;

FIG. 23 is a view illustrating an output waveform of the driving signal generation part in the driving and sensing unit illustrated in FIG. 21 and a corresponding codebook matrix; and FIG. 24 is a view illustrating an output waveform of the driving signal generation part operating according to an exemplary value of a codebook table in the driving and sensing unit in FIG. 21.

DETAILED DESCRIPTION

The present invention will be described in more detail with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, which is an electronic device, may include at least one of, e.g., a smartphone, a tablet personal computer (PC), a display device for a vehicle, a mobile phone, a video phone, an e-book reader, a laptop personal computer (laptop PC), a netbook computer, a mobile medical device, a camera, or a wearable device. Here, the wearable device may include at least one of an accessory device (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable device (e.g., an implantable circuit).

FIG. 2 is a block diagram of a touch input device according to a first embodiment of the present invention, including a display panel 100, a touch controller 200, and a display controller 300.

The display panel 100 includes a touch sensor 150, the touch controller 200 includes a driving and sensing unit 210 and a control unit 220, and the display controller 300 includes a gate driving circuit 310, a display control unit 320, and a data driving circuit 330.

(a) and (b) of FIG. 3 are views for explaining multi-driving of the touch sensor 150 illustrated in FIG. 2.

An operation of the touch input device according to the first embodiment of the present invention will be described below with reference to FIGS. 1 to 3.

The touch control unit 200 controls the touch sensor 150.

The touch controller 200 may sequentially supply a driving signal to a plurality of driving electrodes of the touch sensor 150 or simultaneously supply a predetermined driving signal to at least two driving electrodes among the plurality of driving electrodes. The former is called as a sequential driving method, and the latter is called as a multi-driving method.

The touch controller 200 receives a sensing signal output from the plurality of receiving electrodes of the touch sensor 150. Here, the sensing signal may include information on an amount of capacitance variation between the receiving electrode and the driving electrode adjacent thereto, a low ground mass (LGM) noise signal, and a display noise signal.

The touch controller 200 may analog-to-digital convert the sensing signal output from the plurality of receiving electrodes to output a digital sensing signal.

The touch controller 200 may output two differential signals among the sensing signals output from the plurality of receiving electrodes and perform analog-to-digital conversion on the output differential signals. To this end, the touch controller 200 may include a comparator and an ADC. The touch controller 200 may detect whether a touch is generated and/or a touch position based on the digital signal output from the touch controller 200.

In FIG. 2, the control unit 200 may be realized as one module, unit, or chip. However, the embodiment of the present invention is not limited thereto. The touch controller 200 may be divided into: a driving and sensing unit 210 that applies a driving signal to the driving electrode of the touch sensor 150 and receives a sensing signal from the receiving electrode of the touch sensor 150; and a control unit 220 that controls the driving and sensing unit 210. Alternatively, the driving and sensing unit 210 and the control unit 220 may be realized as one module, unit, or chip.

The touch input device in FIG. 2 may include a display panel 100.

A plurality of scan lines (or gate lines) and a plurality of data lines may be disposed on the display panel 100. A subpixel may be disposed in an area in which the scan line crosses the data line.

The display panel 100 may include an active area on which a plurality of subpixels are disposed and an inactive area disposed outside the active area. The active area may constitute a display screen of the touch input device. The display screen may have a rectangular shape in which a horizontal length is greater than a vertical length.

The touch input device illustrated in FIG. 2 may include the display controller 300 including the gate driving circuit 310, the display control unit 320, and the data driving circuit 330 for driving all sorts of signal lines disposed on the display panel 100 in order to drive the display panel 100.

The gate driving circuit 310 may be controlled by the display control unit 320 and control a driving timing of a plurality of subpixels by sequentially outputting a display scan signal to the plurality of scan lines disposed on the display panel 100.

The data driving circuit 330 may receive image data from the display control unit 320 and convert the image data into an analog type data voltage. The data driving circuit 330 may control each subpixel to display brightness according to the image data by outputting the data voltage (Vdata) to each data line in accordance with a timing when the scan signal is applied through the scan line.

The display control unit 320 may supply all sorts of control signals to the gate driving circuit 310 and the data driving circuit 330 and control operations of the gate driving circuit 310 and the data driving circuit 330. The display control unit 320 may be provided separately from or integrated with the control unit 220 illustrated in FIG. 2.

Various embodiments of the touch sensor 150 according to the first embodiment of the present invention in FIG. 2 will be described in detail with reference to the drawings below.

FIG. 3 is a plan view illustrating a portion of an embodiment of the touch sensor 150 in FIG. 2.

FIG. 4 is plan views illustrating a state in which the touch sensor in FIG. 3 is separated by layers.

FIG. 5 is a view for explaining electrical connection of a plurality of receiving electrodes in FIG. 4.

Referring to FIGS. 3 to 5, the touch sensor according to an embodiment of the present invention may be disposed on or in the display panel.

The touch sensor according to the first embodiment of the present invention includes a plurality of first electrodes and a plurality of second electrodes. Among the plurality of first electrodes and the plurality of second electrodes, electrodes to which the driving signal is applied may serve as the driving electrodes, and the rest electrodes may serve as the receiving electrodes.

Hereinafter, the plurality of first electrodes serve as a plurality of driving electrodes TX0, TX1, TX2, TX3 . . . , and the plurality of second electrodes serve as a plurality of receiving electrodes RX0, RX1, RX2, RX3, RX4, etc.

The plurality of driving electrodes TX0, TX1, TX2, TX3, . . . may include a 0-th driving electrode TX0, a first driving electrode TX1, a second driving electrode TX2, and a third driving electrode TX3. Here, the plurality of driving electrodes TX0, TX1, TX2, TX3 . . . correspond to the plurality of driving electrodes TX0, TX1, TX2, . . . illustrated in FIG. 2.

The plurality of receiving electrodes RX0, RX1, RX2, RX3, RX4, . . . may include a 0-th receiving electrode RX0, a first receiving electrode RX1, a second receiving electrode RX2, a third receiving electrode RX3, and a fourth receiving electrode RX4. Here, the plurality of receiving electrodes RX0, RX1, RX2, RX3, RX4, . . . correspond to the plurality of receiving electrodes RX0, RX1, Rx2, Rx4, . . . illustrated in FIG. 2.

The plurality of driving electrodes TX0, TX1, TX2, TX3 . . . , . . . may be arranged in a second direction (or vertical direction) and each extend in a first direction (or horizontal direction) perpendicular to the second direction. The plurality of receiving electrodes RX0, RX1, RX2, RX3, RX4, . . . may be arranged in the second direction. Here, on the contrary, the plurality of driving electrodes TX0, TX1, TX2, TX3 . . . , . . . may be arranged in the first direction (or horizontal direction), and the plurality of receiving electrodes RX0, RX1, RX2, RX3, RX4 . . . , . . . may be arranged in the second direction (or vertical direction).

A predetermined capacitance may be formed between the plurality of driving electrodes TX0, TX1, TX2, TX3, . . . and the plurality of receiving electrodes RX0, RX1, RX2, RX3, RX4, . . . . The capacitance is varied when a touch input is generated at a corresponding point or a surrounding thereof. Thus, whether a touch is generated or a touch input may be detected by detecting an amount of variation in capacitance from a signal output from the plurality of receiving electrodes RX0, RX1, RX2, RX3, RX4, etc.

Each of the plurality of driving electrodes TX0, TX1, TX2, TX3 . . . may have a rectangular pattern or bar pattern shape extending in the first direction and have a plurality of openings O disposed adjacent thereto and arranged in the first direction.

One receiving electrode may be disposed in each opening O. Each opening O has a shape corresponding to that of one receiving electrode disposed adjacent thereto.

For example, as illustrated in FIG. 3, the rest except for openings disposed on left and right edges among the plurality of openings O may have a rhombus shape, and the openings disposed on the left and right edges may each have a triangular shape. Although not shown in the drawings, each of the openings O may have a rhombus shape. Also, each of the plurality of openings O may have various shapes such as a polygon, a rectangle, a circle or an oval.

Each of the receiving electrodes RX0, RX1, RX2, RX3, RX4, . . . includes a plurality of receiving electrode patterns RX0*a*, RX0*b*, RX1*a*, RX1*b*, RX2*a*, RX2*b*, RX3*a*, RX3*b*, RX4*a*, and RX4*b* and connecting patterns P0, P1, P2, P3, and P4. Here, some receiving electrode patterns RX0*a*, RX1*a*, RX2*a*, RX3*a*, and RX4*a* among the plurality of receiving electrode patterns RX0*a*, RX0*b*, RX1*a*, RX1*b*, RX2*a*, RX2*b*, RX3*a*, RX3*b*, RX4*a*, and RX4*b* may correspond to the some receiving electrodes Rx0*a*, Rx1*a*, Rx2*a*, Rx3*a*, . . . in FIG. 2, and the rest receiving electrode patterns RX0*b*, RX1*b*, RX2*b*, RX3*b*, and RX4*b* may correspond to the rest receiving electrodes Rx0*b*, Rx1*b*, Rx2*b*, Rx3*b*, . . . in FIG. 2.

As illustrated in (a) of FIG. 4, the plurality of driving electrodes TX0, TX1, TX2, TX3 . . . and the plurality of receiving electrode patterns RX0*a*, RX0*b*, RX1*a*, RX1*b*, RX2*a*, RX2*b*, RX3*a*, RX3*b*, RX4*a*, and RX4*b* may be disposed together on a first layer.

Here, the plurality of driving electrodes TX0, TX1, TX2, TX3 . . . and the plurality of receiving electrode patterns RX0*a*, RX0*b*, RX1*a*, RX1*b*, RX2*a*, RX2*b*, RX3*a*, RX3*b*, RX4*a*, and Rx4*b*, which are disposed on the first layer, may be made of a metal mesh.

As illustrated in (b) of FIG. 4, a plurality of connecting patterns P0*a*, P0*b*, P1*a*, P1*b*, P2*a*, P2*b*, P3*a*, P3*b*, P4*a*, and P4*b* may be disposed on a second layer. The second layer is different from the first layer in (a) of FIG. 4 and electrically insulated from the first layer. Here, the plurality of connecting patterns P0*a*, P0*b*, P1*a*, P1*b*, P2*a*, P2*b*, P3*a*, P3*b*, P4*a*, and P4*b* may be made of a metal mesh. The first layer of (a) of FIG. 4 may be disposed on the second layer of (b) of FIG. 4, and vice versa.

The plurality of receiving electrode patterns contained in each receiving electrode may be divided into at least two groups. The receiving electrode patterns of another group are alternately arranged between the receiving electrode patterns of one group. The receiving electrode patterns of the one group are electrically separated from the receiving electrode patterns in the another group.

Here, the receiving electrode pattern in the one group may be referred to as a first receiving electrode pattern, and the receiving electrode pattern in the another group may be referred to as a second receiving electrode pattern.

The plurality of connection patterns contained in each receiving electrode include first connection patterns that electrically connect the first receiving electrode patterns in the one group and second connection patterns that electrically connect the second receiving electrode patterns in the other group.

For example, the 0-th receiving electrode RX0 may include the plurality of receiving electrode patterns RX0a and RX0b and the plurality of connection patterns P0. The plurality of receiving electrode patterns RX0a and RX0b may include the receiving electrode patterns RX0a of the first group and the receiving electrode patterns Rx0b of the second group, which are alternately arranged one by one in the second direction. The receiving electrode patterns RX0a of the first group and the receiving electrode patterns RX0b of the second group may be electrically separated from each other.

The 0-th connection pattern P0 may include first connection patterns P0a that electrically connect the receiving electrode patterns RX0a of the first group and second connection patterns P0b that electrically connect the receiving electrode patterns Rx0b of the second group.

The first receiving electrode RX1 may include the plurality of receiving electrode patterns RX1a and RX1b and the plurality of connection patterns P1. The plurality of receiving electrode patterns RX1a and RX1b may include the receiving electrode patterns RX1a of the first group and the receiving electrode patterns Rx1b of the second group, which are alternately arranged one by one in the second direction. The receiving electrode patterns RX1a of the first group and the receiving electrode patterns RX1b of the second group may be electrically separated from each other.

The first connection pattern P1 may include first connection patterns P1a that electrically connect the receiving electrode patterns RX1a of the first group and second connection patterns P1b that electrically connect the receiving electrode patterns RX1b of the second group.

The second receiving electrode RX2 may include the plurality of receiving electrode patterns RX2a and RX2b and the plurality of connection patterns P2. The plurality of receiving electrode patterns RX2a and RX2b may include the receiving electrode patterns RX2a of the first group and the receiving electrode patterns Rx2b of the second group, which are alternately arranged one by one in the second direction. The receiving electrode patterns RX2a of the first group and the receiving electrode patterns RX2b of the second group may be electrically separated from each other.

The second connection pattern P2 may include first connection patterns P2a that electrically connect the receiving electrode patterns RX2a of the first group and second connection patterns P2b that electrically connect the receiving electrode patterns RX2b of the second group.

The third receiving electrode RX3 may include the plurality of receiving electrode patterns RX3a and RX3b and the plurality of connection patterns P3. The plurality of receiving electrode patterns RX3a and RX3b may include the receiving electrode patterns RX3a of the first group and the receiving electrode patterns RX3b of the second group, which are alternately arranged one by one in the second direction. The receiving electrode patterns RX3a of the first group and the receiving electrode patterns RX3b of the second group may be electrically separated from each other.

The third connection pattern P3 may include first connection patterns P3a that electrically connect the receiving electrode patterns RX3a of the first group and second connection patterns P3b that electrically connect the receiving electrode patterns Rx3b of the second group.

The fourth receiving electrode RX4 may include the plurality of receiving electrode patterns RX4a and RX4b and the plurality of connection patterns P4. The plurality of receiving electrode patterns RX4a and RX4b may include the receiving electrode patterns Rx4a of the first group and the receiving electrode patterns Rx4b of the second group, which are alternately arranged one by one in the second direction. The receiving electrode patterns RX4a of the first group and the receiving electrode patterns RX4b of the second group may be electrically separated from each other.

The fourth connection pattern P4 may include first connection patterns P4a that electrically connect the receiving electrode patterns RX4a of the first group and second connection patterns P4b that electrically connect the receiving electrode patterns Rx4b of the second group.

The plurality of receiving electrode patterns RX0a, RX0b, RX1a, RX1b, RX2a, RX2b, RX3a, RX3b, RX4a, and RX4b are disposed adjacent to the plurality of openings O of the plurality of driving electrodes TX0, TX1, TX2, TX3, etc. One receiving electrode pattern is disposed adjacent to the one opening O. Each of the receiving electrode patterns has a shape corresponding to that of the corresponding opening.

In the random receiving electrode RX1, a portion of the driving electrode TX0 directly adjacent to a periphery of the receiving electrode pattern RX1a of the first group and a portion of the driving electrode TX1 directly adjacent to a periphery of the receiving electrode pattern RX1b of the second group are disposed together between the receiving electrode pattern RX1a of the first group and the receiving electrode pattern RX1b of the second group.

The random driving electrode TX0 is disposed directly adjacent to a periphery of the receiving electrode patterns RX0a, RX1a, RX2a, RX3a, and RX4a of one group, and another driving electrode TX1 disposed directly adjacent to a periphery of the receiving electrode patterns RX0a, RX1a, RX2a, RX3a, and RX4a of another group is separated from the receiving electrode patterns RX0a, RX1a, RX2a, RX3a, and RX4a of one group by the random driving electrode TX0.

Each of the connection patterns P0a, P0b, P1a, P1b, P2a, P2b, P3a, P3b, P4a, and P4b may have a bar pattern shape extending in the second direction and include at least one conductive via v. The conductive via v may be disposed at both ends of each of the connection patterns.

In the 0-th receiving electrode RX0, each of the first connection patterns P0a electrically connects two adjacent receiving electrode patterns RX0a through the conductive via v among the receiving electrode patterns RX0a of the first group and is disposed below the receiving electrode patterns RX0b of the second group, which are disposed between the two adjacent receiving electrode patterns RX0a, to overlap the receiving electrode patterns RX0b of the second group.

Each of the second connection patterns P0b electrically connects two adjacent receiving electrode patterns RX0b through the conductive via v among the receiving electrode patterns RX0b of the second group and is disposed below the receiving electrode patterns RX0a of the first group, which are disposed between the two adjacent receiving electrode patterns RX0b of the first group, to overlap the receiving electrode patterns RX0a of the first group.

The first connection patterns P1a, P2a, P3a, and P4a and the second connection patterns P1b, P2b, P3b, and P4b of the rest receiving electrodes RX1, RX2, RX3, and RX4 are disposed in the same manner as described above.

Hereinafter, an operation when the driving signal is applied to at least one of the plurality of driving electrodes TX0, TX1, TX2, and TX3 will be described in detail.

For convenience of understanding, an operation of the first receiving electrode RX1 and an operation of the sensing unit 210 in FIG. 2 will be described in detail.

When the driving signal is applied sequentially or simultaneously to the plurality of driving electrodes TX0, TX1, TX2, and TX3, two sensing signals are output through the first connection pattern P1. A first signal is output through the first connection pattern P1a, and a second signal is output through the second connection pattern P1b.

Thus, two channels of first and second signals are output from each of the receiving electrodes RX0, RX1, RX2, RX3, and RX4. The first and second signals are simultaneously output to the driving and sensing unit 210 in FIG. 2.

Depending on the driving electrodes TX0, TX1, TX2, TX3 . . . to which a driving signal is applied, one of the first and second signals may serve as an active channel signal (or active receiving signal ARX), and the other may serve as a dummy channel signal (or dummy receiving signal DRX).

Specifically, when a driving signal is applied to the driving electrodes TX0 and/or TX2 on which the receiving electrode patterns RX1a of the first group are arranged, the first signal output through the first connection pattern P1a serve as the active channel signal, and the second signal output through the second connection pattern P1b serve as the dummy channel signal.

On the other hand, when a driving signal is applied to the driving electrodes TX1 and/or TX3 on which the receiving electrode patterns RX1b of the second group are arranged, the second signal output through the second connection pattern P1b serves as the active channel signal, and the first signal output through the first connection pattern P1a serves as the dummy channel signal.

For example, as illustrated in FIG. 3, when a driving signal is applied to the first driving electrode TX1 in a state in which an object (dotted line) is close to or in contact with an intersection point of the first driving electrode TX1 and the first receiving electrode RX1, a capacitance (or mutual active capacitance) formed between the first driving electrode TX1 and the receiving electrode pattern RX1b of the second group of the first receiving electrode RX1 is varied. The second signal including information on an amount of variation of the varied capacitance is an active channel signal output through the second connection pattern P1b.

Also, a capacitance (or dummy capacitance) formed between the first driving electrode TX1 and the receiving electrode patterns RX1a of the first group of the first receiving electrode RX1 is also varied. The first signal including information on an amount of variation of the varied capacitance is a dummy channel signal output through the first connection pattern P1a.

The driving and sensing unit 210 illustrated in FIG. 2 may subtract the first signal output through the first connection pattern P1a from the second signal output through the second connection pattern P1b to cancel all or most of a cathode retransmission noise signal, a LGM noise signal, and a display noise signal input to the receiving electrode pattern RX1b of the second group and the receiving electrode pattern RX1a of the first group.

FIG. 6 is a plan view illustrating a portion of another embodiment of the touch sensor 150 in FIG. 2.

FIG. 7 is plan views illustrating a state in which the touch sensor in FIG. 6 is separated by layers.

FIG. 8 is a view for explaining electrical connection of a plurality of receiving electrodes in FIG. 6.

The touch sensor according to another embodiment of the present invention illustrated in FIGS. 6 to 8 is different in a plurality of receiving electrodes RX0', RX1', RX2', RX3', and RX4' from the touch sensor according to an embodiment of the present invention illustrated in FIGS. 3 to 5.

In particular, a plurality of receiving electrode patterns RX1a' contained in each of the receiving electrodes RX0', RX1', RX2', RX3', and RX4' have different structures. Hereinafter, the structures of the plurality of electrode patterns RX1a' will be described in detail, and the rest components will be replaced with those described above.

Each of the plurality of receiving electrode patterns RX1a' contained in each of the receiving electrodes RX0', RX1', RX2', RX3', and RX4' has an opening O' therein and includes a dummy pattern DX1a disposed in the opening O'. Here, the dummy pattern DX1a may have a shape corresponding to the opening O'.

The dummy pattern DX1a is not electrically connected to connection patterns P0a, P0b, P1a, P1b, P2a, P2b, P3a, P3b, P4a, and P4b. The dummy pattern DX1a maintains an electrically floating state.

An operation of the touch sensor illustrated in FIGS. 6 to 8 according to another embodiment of the present invention is the same as that of the touch sensor illustrated in FIGS. 3 to 5 according to an embodiment of the present invention.

Thus, a touch input device including the touch sensor illustrated in FIGS. 6 to 8 according to another embodiment of the present invention has an advantage of removing various noises generated during touch sensing, e.g., the cathode retransmission noise signal, the display noise signal, and the LGM noise signal.

FIG. 9 is a plan view illustrating a portion of another embodiment of the touch sensor 150 in FIG. 2.

FIG. 10 is plan views illustrating a state in which the touch sensor in FIG. 9 is separated by layers.

The touch sensor according to another embodiment of the present invention illustrated in FIGS. 9 to 10 is different in a plurality of receiving electrodes RX0", RX1", RX2", RX3", and RX4" from the touch sensor according to an embodiment of the present invention illustrated in FIGS. 3 to 5.

In particular, a plurality of connection patterns P0', P1', P2', P3', and P4' contained in each of the receiving electrodes RX0", RX1", RX2", RX3", and RX4" have different arrangement structures and shapes. Hereinafter, the arrangement structures and shapes of the connection patterns P0', P1', P2', P3', and P4' will be described in detail, and the rest components will be replaced with those described above.

Each of the connection patterns P0', P1', P2', P3', and P4' includes first connection patterns P0a', P1a', P2a', P3a', and P4a' and second connection patterns P0b', P1b', P2b', P3b', and P4b'.

Each of the first connection patterns P0a', P1a', P2a', P3a', and P4a' electrically connects two receiving electrode patterns RX0a, RX1a, RX2a, RX3a, and RX4a of the first group so as not to overlap the receiving electrode patterns RX0b, RX1b, RX2b, RX3b, and RX4b of the second group disposed between the two receiving electrode patterns.

For example, at least a portion of each of the first connection patterns P0a', P1a', P2a', P3a', and P4a' may be disposed between the receiving electrode patterns RX0b, RX1b, RX2b, and Rx3b of the second group and the driving electrodes TX0, TX1, TX2, and TX3 disposed directly adjacent to the receiving electrode patterns RX0$b$, RX1$b$, RX2$b$, and RX3$b$ of the second group so as not to overlap the receiving electrode patterns RX0$b$, RX1$b$, RX2$b$, RX3$b$, and Rx4$b$ of the second group.

Also, the rest portion may be disposed to overlap the driving electrodes TX0, TX1, TX2, and TX3.

Each of the second connection patterns P0$b'$, P1$b'$, P2$b'$, P3$b'$, and P4$b'$ electrically connects two receiving electrode patterns RX0$a$, RX1$a$, RX2$a$, RX3$a$, and RX4$a$ of the second group so as not to overlap the receiving electrode patterns RX0$a$, RX1$a$, RX2$a$, RX3$a$, and RX4$a$ of the first group disposed between the two receiving electrode patterns.

For example, at least a portion of each of the second connection patterns P0$b'$, P1$b'$, P2$b'$, P3$b'$, and P4$b'$ may be disposed between the receiving electrode patterns RX0$a$, RX1$a$, RX2$a$, RX3$a$, and RX4$a$ of the first group and the driving electrodes TX0, TX1, TX2, and TX3 disposed directly adjacent to the receiving electrode patterns RX0$a$, RX1$a$, RX2$a$, RX3$a$, and RX4$a$ of the first group so as not to overlap the receiving electrode patterns RX0$a$, RX1$a$, RX2$a$, RX3$a$, and Rx4$a$ of the first group.

Also, the rest portion may be disposed to overlap the driving electrodes TX0, TX1, TX2, and TX3.

The touch sensor according to another embodiment of the present invention may have an advantage of reducing a capacitance value between the first connection patterns and the receiving electrode patterns of the second group or between the second connection patterns and the receiving electrode patterns of the first group in comparison with the touch sensor in FIGS. 3 to 5 according to an embodiment of the present invention.

Although not shown in the drawings, the dummy pattern DX1$a$ in FIGS. 7 and 8 may be applied to the touch sensor according to another embodiment of the present invention.

FIG. 11 is a plan view illustrating a portion of another embodiment of the touch sensor 150 in FIG. 2.

FIG. 12 is plan views illustrating a state in which the touch sensor in FIG. 11 is separated by layers.

The touch sensor according to another embodiment of the present invention illustrated in FIGS. 11 to 12 is different in a plurality of receiving electrodes RX0", RX1", RX2", RX3", and RX4" from the touch sensor according to an embodiment of the present invention illustrated in FIGS. 3 to 5.

In particular, a plurality of receiving electrode patterns RX0$a$-1, RX0$a$-2, RX0$b$-1, RX0$b$-2, RX1$a$-1, RX1$a$-2, RX1$b$-1, RX1$b$-2, RX2$a$-1, RX2$a$-2, RX2$b$-1, RX2$b$-2, RX3$a$-1, RX3$a$-2, RX3$b$-1, and RX3$b$-2 and a plurality of connection patterns P0", P1", P2", and P3" contained in each of the receiving electrodes RX0", RX1", RX2"', and RX3"' have different structures and arrangement shapes.

Hereinafter, the structures and arrangement shapes of the receiving electrode patterns RX0$a$-1, RX0$a$-2, RX0$b$-1, RX0$b$-2, RX1$a$-1, RX1$a$-2, RX1$b$-1, RX1$b$-2, RX2$a$-1, RX2$a$-2, RX2$b$-1, RX2$b$-2, RX3$a$-1, RX3$a$-2, RX3$b$-1, and RX3$b$-2 and the connection patterns P0", P1", P2", and P3" will be described in detail, and the rest components will be replaced with those described above.

The plurality of receiving electrode patterns RX0$a$-1, RX0$a$-2, RX0$b$-1, RX0$b$-2, RX1$a$-1, RX1$a$-2, RX1$b$-1, RX1$b$-2, RX2$a$-1, RX2$a$-2, RX2$b$-1, RX2$b$-2, RX3$a$-1, RX3$a$-2, RX3$b$-1, and RX3$b$-2 of each of the receiving electrodes RX0", RX1", RX2", and RX3"' include the receiving electrode patterns RX0$a$-1, RX0$a$-2, RX1$a$-1, RX1$a$-2, RX2$a$-1, RX2$a$-2, RX3$a$-1, and RX3$a$-2 of the first group and the receiving electrode patterns RX0$b$-1, RX0$b$-2, RX1$b$-1, RX1$b$-2, RX2$b$-1, RX2$b$-2, RX3$b$-1, and Rx3$b$-2 of the second group, which are alternately arranged one by one in the second direction.

The receiving electrode patterns RX0$a$-1, RX0$a$-2, RX1$a$-1, RX1$a$-2, RX2$a$-1, RX2$a$-2, RX3$a$-1, and RX3$a$-2 of the first group and the receiving electrode patterns RX0$b$-1, RX0$b$-2, RX1$b$-1, RX1$b$-2, RX2$b$-1, RX2$b$-2, RX3$b$-1, and RX3$b$-2 of the second group may be electrically separated from each other.

Each of the first group of receiving electrode patterns RX0$a$-1, RX0$a$-2, RX1$a$-1, RX1$a$-2, RX2$a$-1, RX2$a$-2, RX3$a$-1, and RX3$a$-2 includes first receiving electrode patterns RX0$a$-1, RX1$a$-1, RX2$a$-1, and RX3$a$-1 and second receiving electrode patterns RX0$a$-2, RX1$a$-2, RX2$a$-2, and RX3$a$-2. The first receiving electrode patterns RX0$a$-1, RX1$a$-1, RX2$a$-1, and RX3$a$-1 and the second receiving electrode patterns RX0$a$-2, RX1$a$-2, RX2$a$-2, and RX3$a$-2 are disposed in two opening O adjacent to each other in the first direction in the corresponding driving electrodes TX0 and TX2, respectively.

One first or second receiving electrode pattern is disposed in the openings disposed at both side edges among a plurality of openings O of each of the driving electrodes TX0, TX1, TX2, and TX3, and the second receiving electrode pattern of the first group of receiving electrode patterns of one receiving electrode and the first receiving electrode pattern of the first group of receiving electrode patterns of another receiving electrode are disposed together in the rest openings while being spaced apart from each other among the plurality of receiving electrodes RX0"', RX1"', RX2"', and RX3"'.

Each of the connection patterns P0", P1", P2", and P3" includes first connection patterns P0$a$", P1$a$", P2$a$", and P3$a$" electrically connecting the receiving electrode patterns RX0$a$-1, RX0$a$-2, RX1$a$-1, RX1$a$-2, RX2$a$-1, RX2$a$-2, RX3$a$-1, and RX3$a$-2 of the first group and second connection patterns P0$b$", P1$b$", P2$b$", and P3$b$" electrically connecting the receiving electrode patterns RX0$b$-1, RX0$b$-2, RX1$b$-1, RX1$b$-2, RX2$b$-1, RX2$b$-2, RX3$b$-1, and Rx3$b$-2 of the second group.

Each of the first connection patterns P0$a$", P1$a$", P2$a$", and P3$a$" and the second connection patterns P0$b$", P1$b$", P2$b$", and P3$b$" are configured and arranged to connect two adjacent receiving electrode patterns for each group with a minimum distance.

For example, each of the first connection patterns P0$a$", P1$a$", P2$a$", and P3$a$" and the second connection patterns P0$b$", P1$b$", P2$b$", and P3$b$" may have one end connected to one side of a lower end of one of two adjacent receiving electrode patterns of one group and the other end connected to one side of an upper end of the other receiving electrode pattern. The rest portion except for the one end and the other end has a shape extending in the second direction and overlaps the opening O of the driving electrode with a maximum cross-sectional area instead of overlapping the receiving electrode pattern of another group disposed between the one receiving electrode pattern and the other receiving electrode pattern.

Also, each of the first connection patterns P0$a$", P1$a$", P2$a$", and P3$a$" further includes a receiving connection pattern electrically connecting the first receiving electrode pattern and the second receiving electrode pattern of the first group of receiving electrode patterns, and each of the second connection patterns P0$b$", P1$b$", P2$b$", and P3$b$" further includes a receiving connection pattern electrically connecting the first receiving electrode pattern and the second receiving electrode pattern of the second group of receiving electrode patterns.

The touch sensor according to another embodiment of the present invention may have an advantage of reducing a capacitance value between the first connection patterns and the receiving electrode patterns of the second group or between the second connection patterns and the receiving electrode patterns of the first group in comparison with the touch sensor in FIGS. 3 to 5 according to an embodiment of the present invention.

FIG. 13 is a plan view illustrating a portion of another embodiment of the touch sensor 150 in FIG. 2.

A touch sensor in FIG. 13 according to another embodiment of the present invention includes a plurality of driving electrodes Tx0 and a plurality of receiving electrodes Rx0.

Each of driving electrodes Tx0 includes diamond-shaped pattern parts arranged along one direction, and a connection pattern part connecting two adjacent pattern parts of the pattern parts to each other.

Each of receiving electrodes Rx0 includes a first electrode part Rx0a and a second electrode part Rx0b arranged along a direction different from the one direction. Each of the first electrode part Rx0a and the second electrode part Rx0b may have a triangular shape. One first electrode part Rx0a and one second electrode part Rx0b, which are disposed adjacent to each other, may have an overall diamond shape.

The first electrode part Rx0a is relatively closer to the driving electrode Tx0 than the second electrode part Rx0b. The second electrode part Rx0b is relatively closer to another driving electrode than the first electrode part Rx0a.

The first electrode parts Rx0a may be electrically connected to each other through a plurality of conductive traces. The second electrode parts Rx0b may be electrically connected to each other through a plurality of conductive traces.

FIG. 14 is a block diagram illustrating a touch input device according to a second embodiment of the present invention.

The touch input device illustrated in FIG. 14 has a difference in comparison with the touch input device according to the first embodiment illustrated in FIG. 2 as stated below.

Specifically, a touch sensor 150' of the touch input device illustrated in FIG. 14 includes electrodes each having a predetermined shape, and the predetermined electrodes include a plurality of first electrodes and a plurality of second electrodes.

Although, in the touch sensor 150 illustrated in FIG. 2, the plurality of first electrodes serve as the plurality of driving electrodes Tx0, Tx1, Tx2, . . . , and the plurality of second electrodes serve as the plurality of receiving electrodes Rx0, Rx1, Rx2, . . . , in the touch sensor 150' illustrated in FIG. 14, on the contrary, a plurality of first electrodes serve as a plurality of receiving electrodes Rx0, Rx1, Rx2, . . . , and a plurality of second electrodes serve as a plurality of driving electrodes Tx0, Tx1, Tx2, etc.

In other words, in comparison with the touch sensor 150 illustrated in FIG. 2, in the touch sensor 150' illustrated in FIG. 14, the plurality of driving electrodes Tx0, Tx1, Tx2, . . . are replaced with the plurality of receiving electrodes Rx0, Rx1, Rx2, . . . , and the plurality of receiving electrodes Rx0, Rx1, Rx2, . . . are replaced with the plurality of driving electrodes Tx0, Tx1, Tx2, etc.

The feature in which the plurality of first electrodes serve as the plurality of driving electrodes as illustrated in FIG. 2 or serve as the plurality of receiving electrodes as illustrated in FIG. 14 may be determined by control of a control unit 220.

When the control unit applies a driving signal to the plurality of first electrodes, the plurality of first electrodes may serve as the plurality of driving electrodes, and when the control unit applies a driving signal to the plurality of second electrodes, the plurality of second electrodes may serve as the plurality of driving electrodes.

The plurality of driving electrodes Tx0, Tx1, Tx2, . . . and the plurality of receiving electrodes Rx0, Rx1, Rx2, . . . may be arranged to cross each other. Each of the driving electrodes Tx0, Tx1, Tx2, . . . may extend in a second axis direction, and each of the receiving electrode Rx0, Rx1, Rx2, . . . may extend in a first axis direction different from the second axis direction. Here, the first axis direction may be perpendicular to the second axis direction.

Some driving electrodes Tx0a, Tx1a, Tx2a, Tx3a, . . . among the plurality of driving electrodes Tx0, Tx1, Tx2, . . . may be arranged to form a mutual capacitance Cm with even-numbered receiving electrodes Rx0, Rx2, Rx4, Rx6, . . . among the plurality of receiving electrodes Rx0, Rx1, Rx2, . . . , and the rest driving electrodes Tx0, Tx1, Tx2, . . . among the plurality of driving electrodes Tx0, Tx1, Tx2, . . . may be arranged to form a mutual capacitance Cm with odd-numbered receiving electrodes Rx1, Rx3, Rx5, Rx7, . . . among the plurality of receiving electrodes Rx0, Rx1, Rx2, etc.

Some driving electrodes Tx0a, Tx1a, Tx2a, Tx3a, . . . among the plurality of driving electrodes Tx0, Tx1, Tx2, . . . may be arranged directly adjacent to the even-numbered receiving electrodes Rx0, Rx2, Rx4, Rx6, . . . among the plurality of receiving electrodes Rx0, Rx1, Rx2, . . . and spaced a predetermined distance from the odd-numbered receiving electrodes Rx1, Rx3, Rx5, Rx7, . . . among the plurality of receiving electrodes Rx0, Rx1, Rx2, . . . instead of being directly adjacent thereto.

Here, at least one different electrode may be disposed between the some driving electrodes Tx0a, Tx1a, Tx2a, Tx3a, . . . and the rest odd-numbered receiving electrodes Rx1, Rx3, Rx5, Rx7, . . . . The different electrode may be the even-numbered receiving electrodes Rx0, Rx2, Rx4, Rx6, etc.

The rest driving electrodes Tx0b, Tx1b, Tx2b, Tx3b, . . . among the driving electrodes Tx0, Tx1, Tx2, . . . may be arranged directly adjacent to the rest receiving odd-numbered electrodes Rx1, Rx3, Rx5, Rx7, . . . among the plurality of receiving electrodes Rx0, Rx1, Rx2, . . . and spaced a predetermined distance from the even-numbered receiving electrodes Rx0, Rx2, Rx4, Rx6, . . . instead of being directly adjacent thereto.

Here, at least one different electrode may be disposed between the rest driving electrodes Tx0b, Tx1b, Tx2b, Tx3b, . . . and the some even-numbered receiving electrodes Rx0, Rx2, Rx4, Rx6, etc. The different electrode may be the rest odd-numbered receiving electrodes Rx1, Rx3, Rx5, Rx7, etc.

The driving signal applied to the rest driving electrodes Tx0b, Tx1b, Tx2b, Tx3b, . . . may be an inverted driving signal obtained by inverting only a phase by 180° from the driving signal applied to some driving electrodes Tx0a, Tx1a, Tx2a, Tx3a, etc.

For example, a driving signal applied to the driving electrode Tx0b of two driving electrodes Tx0a and Tx0b of 0-th driving electrodes Tx0 may be an inverted driving signal obtained by inverting the driving signal applied to Tx0a.

The touch input device illustrated in FIG. 14 may perform a multi-driving of simultaneously applying driving signals to all driving electrodes Tx0, Tx1, Tx2, Tx3, . . . of the touch sensor 150', and a flicker does not occur on the display panel although the multi-driving is performed.

Also, since the multi-driving of all driving electrodes Tx0, Tx1, Tx2, Tx3, . . . may be performed, a driving time for performing mutual sensing may be reduced. Furthermore, since a turn-on time of an analog front end (AFE) may be reduced, power consumption may be further reduced.

FIG. 15 is a plan view illustrating a portion of an embodiment of the touch sensor 150' illustrated in FIG. 13.

An embodiment of the touch sensor 150' illustrated in FIG. 15 has the same structure of a plurality of electrodes as an embodiment of the touch sensor 150 illustrated in FIG. 3, but has a difference in that the driving electrodes TX0, TX1, TX2, TX3, and TX4 to which the driving signal is applied and the receiving electrodes RX0, RX1, RX2, and RX3 through which the receiving signal is output are reversely provided.

Referring to FIG. 15, the control unit 220 illustrated in FIG. 14 may control predetermined driving signals to be applied simultaneously to the connection patterns P0, P1, P2, P3, P4, . . . of the plurality of driving electrodes TX0, TX1, TX2, TX3, TX4, etc. Here, the driving signal applied to the second connection pattern P0b of each of the connection patterns P0 is an inverted driving signal having a phase inverted by 180° from the driving signal applied to the first connection pattern P0a.

The control unit 220 illustrated in FIG. 14 may receive receiving signals having information on an amount of variation in mutual capacitance from the plurality of receiving electrodes RX0, RX1, RX2, RX3, . . . and output differential signals from the received receiving signals. Then, the received signals received from the plurality of receiving electrodes RX0, RX1, RX2, RX3, . . . may be restored by integrating the differential signals, and a touch position of an object may be determined based on the information on the amount of variation in mutual capacitance, in which signs of the restored receiving signals are processed.

FIG. 16 is a plan view illustrating a portion of another embodiment of the touch sensor 150' illustrated in FIG. 14.

Another embodiment of the touch sensor 150' illustrated in FIG. 16 has the same structure of a plurality of electrodes as an embodiment of the touch sensor 150 illustrated in FIG. 2, but has a difference in that the driving electrodes to which the driving signal is applied and the receiving electrodes through which the receiving signal is output are reversely provided.

Referring to FIG. 16, the control unit 220 illustrated in FIG. 14 may control predetermined driving signals to be applied simultaneously to the connection patterns P0, P1, P2, P3, P4, . . . of the plurality of driving electrodes TX0, TX1, TX2, TX3, TX4, etc. Here, the driving signal applied to the second connection pattern P0b of each of the connection patterns P0 is an inverted driving signal having a phase inverted by 180° from the driving signal applied to the first connection pattern P0a.

The control unit 220 illustrated in FIG. 14 may receive receiving signals having information on an amount of variation in mutual capacitance from the plurality of receiving electrodes RX0, RX1, RX2, RX3, . . . and output differential signals from the received receiving signals.

Also, the receiving signals received from the plurality of receiving electrodes RX0, RX1, RX2, RX3, . . . may be restored again by integrating the differential signals, and a touch position of an object may be determined based on the information on the amount of variation in mutual capacitance, in which signs of the restored receiving signals are processed.

FIG. 17 is a plan view illustrating a portion of another embodiment of the touch sensor 150' illustrated in FIG. 14.

Another embodiment of the touch sensor 150' illustrated in FIG. 17 has the same structure of a plurality of electrodes as another embodiment of the touch sensor 150 illustrated in FIG. 9, but has a difference in that the driving electrodes to which the driving signal is applied and the receiving electrodes through which the receiving signal is output are reversely provided.

Referring to FIG. 17, the control unit 220 illustrated in FIG. 14 may control predetermined driving signals to be applied simultaneously to the connection patterns P0', P1', P2', P3', P4', . . . of the plurality of driving electrodes TX0", TX1", TX2", TX3", TX4", etc. Here, the driving signal applied to the second connection pattern P0b of each of the connection patterns P0' is an inverted driving signal having a phase inverted by 180° from the driving signal applied to the first connection pattern P0a.

The control unit 220 illustrated in FIG. 14 may receive receiving signals having information on an amount of variation in mutual capacitance from the plurality of receiving electrodes RX0, RX1, RX2, RX3, . . . and output differential signals from the received receiving signals.

Also, the receiving signals received from the plurality of receiving electrodes RX0, RX1, RX2, RX3, . . . may be restored again by integrating the differential signals, and a touch position of an object may be determined based on the information on the amount of variation in mutual capacitance, in which signs of the restored receiving signals are processed.

FIG. 18 is a plan view illustrating a portion of another embodiment of the touch sensor 150' illustrated in FIG. 14.

Another embodiment of the touch sensor 150' illustrated in FIG. 18 has the same structure of a plurality of electrodes as another embodiment of the touch sensor 150 illustrated in FIG. 11, but has a difference in that the driving electrodes to which the driving signal is applied and the receiving electrodes through which the receiving signal is output are reversely provided.

Referring to FIG. 18, the control unit 220 illustrated in FIG. 14 may control predetermined driving signals to be applied simultaneously to the connection patterns P0", P1", P2", P3", . . . of the plurality of driving electrodes TX0"', TX1"' TX2"', TX3"', etc. Here, the driving signal applied to the second connection pattern P0b of each of the connection patterns P0" is an inverted driving signal having a phase inverted by 180° from the driving signal applied to the first connection pattern P0a.

The control unit 220 illustrated in FIG. 14 may receive receiving signals having information on an amount of variation in mutual capacitance from the plurality of receiving electrodes RX0, RX1, RX2, RX3, . . . and output differential signals from the received receiving signals.

Also, the receiving signals received from the plurality of receiving electrodes RX0, RX1, RX2, RX3, . . . may be restored again by integrating the differential signals, and a touch position of an object may be determined based on the information on the amount of variation in mutual capacitance, in which signs of the restored receiving signals are processed.

FIG. 19 is a plan view illustrating a portion of another embodiment of the touch sensor 150' illustrated in FIG. 14.

Another embodiment of the touch sensor illustrated in FIG. 19 has the same structure of a plurality of electrodes as an embodiment of the touch sensor illustrated in FIG. 18, but has a difference in that the driving electrodes to which the driving signal is applied and the receiving electrodes through which the receiving signal is output are reversely provided.

Referring to FIG. 19, the control unit 200 illustrated in FIG. 14 may control predetermined driving signals to be applied simultaneously to the first driving electrode part Tx0a and the second driving electrode part Tx0b of the plurality of driving electrodes Tx0.

Here, the driving signal applied to the first driving electrode part Tx0a is an inverted driving signal having a phase inverted by 180° from the driving signal applied to the second driving electrode part Tx0b.

The control unit 200 illustrated in FIG. 14 may receive receiving signals having information on an amount of variation in mutual capacitance from the plurality of receiving electrodes RX0, RX1, RX2, RX3, . . . and output differential signals from the received receiving signals.

Also, the receiving signals received from the plurality of receiving electrodes RX0, RX1, RX2, RX3, . . . may be restored again by integrating the differential signals, and a touch position of an object may be determined based on the information on the amount of variation in mutual capacitance, in which signs of the restored receiving signals are processed.

(a) and (b) of FIG. 20 are views for explaining the multi-driving of the touch sensor 150 illustrated in FIG. 2.

FIG. 21 is a block diagram of a touch controller in the touch input device illustrated in FIG. 2 and includes a driving and sensing unit 210 and a control unit 220.

The driving and sensing unit 210 includes a codebook table 211, a first register 212, a DMA 213, a driving signal generation part 214, and a plurality of sensing sensors 215, and the control unit 220 includes a processor 221, an external serial interface 222, a general-purpose input/output part 223, and a second register 224.

FIG. 22 is a view illustrating an output waveform of the driving signal generation part in the driving and sensing unit illustrated in FIG. 21 and a corresponding codebook matrix.

FIG. 23 is a view illustrating an output waveform of the driving signal generation part in the driving and sensing unit illustrated in FIG. 21 and a corresponding codebook matrix.

FIG. 24 is a view illustrating an output waveform of the driving signal generation part operating according to an exemplary value of the codebook table in the driving and sensing unit illustrated in FIG. 21.

An operation of the touch controller according to an embodiment of the present invention will be described with reference to FIGS. 20 to 24.

As illustrated in (a) of FIG. 20, the multi-driving of the touch sensor 150 illustrated in FIG. 2 may simultaneously apply (Touch Scan 1) a predetermined driving signal to four driving electrodes Tx0, Tx1, Tx2, and Tx3 in a predetermined first time period, simultaneously apply (Touch Scan 2) the driving signal to other four driving electrodes Tx4, Tx5, Tx6, and Tx7 in a second time period after the first time period, and simultaneously apply (Touch Scan 3) the driving signal to other four driving electrodes Tx8, Tx9, Tx10, and Tx11 in a third time period after the second time period.

Also, the multi-driving of the touch sensor 150 may simultaneously apply (Touch Scan 4) the driving signal to other four driving electrodes Tx12, Tx13, Tx14, and Tx15 in a fourth time period after the third time period and simultaneously apply (Touch Scan 5) the driving signal to other four driving electrodes Tx16, Tx17, Tx18, and Tx19 in a fifth time period after the fourth time period.

In (a) of FIG. 20, areas of Touch Scans indicate areas of four driving electrodes to which four driving signals are simultaneously applied during the same time period for convenience of explanation.

(b) of FIG. 20 is an example of driving signals that are simultaneously applied to the four driving electrodes in each Touch Scan. Each of the driving signals may be obtained by continuing a vector value expressed as either −1, 0, or 1 for each predetermined time period t1, t2, t3, and t4 as many as the number of the driving electrodes.

For example, driving signals having vector values of 1, 1, 1, and −1 are simultaneously applied to the driving electrodes Tx0, Tx1, Tx2, and Tx3 in the first time period t1, driving signals having vector values of 1, 1, −1, and 1 are simultaneously applied to the driving electrodes Tx0, Tx1, Tx2, and Tx3 in the second time period t2, driving signals having vector values of 1, −1, 1, and 1 are simultaneously applied to the driving electrodes Tx0, Tx1, Tx2, and Tx3 in the third time period t3, and driving signals having vector values of −1, 1, 1, and 1 are simultaneously applied to the driving electrodes Tx0, Tx1, Tx2, and Tx3 in the fourth time period t4. Here, the vector value '1' and the vector value '−1' are vector values of each row and each column constituting the codebook matrix as in FIG. 22. The vector value '1' maintains a phase of the driving signal, and the vector value '−1' inverts the phase of the driving signal.

Although four time periods and four driving electrodes are exemplified for easy understanding in this embodiment, five or more time periods and driving electrodes may be set, and thus, the codebook matrix may be stored as a 5×5 matrix or more.

As illustrated in FIG. 23, the codebook table 211 matches a plurality of codes programmed by firmware built in the processor 221 with a plurality of addresses, respectively, and store the matched codes.

Here, the codebook table that is a table capable of storing data such as internal and external memory or logic registers of a touch controller such as SRAM or NVM collects code vectors for encoding and/or decoding of data.

Here, the plurality of codes may include binary data having a predetermined bit of a driving signal scanned for each time slot.

The number of codes x (the number of Tx×2) codes may be stored in advance in the first register 212 (or SRAM).

For example, when the number of TX is 20 and the number of codes is set to 128, the code has a length of 128×40.

2 bits may be allocated for each driving signal channel (TX CH) to control a combination of codes.

For example, 00b may be set as a low level signal, 01b may be set as a pulse signal, 10b may be set as a high level signal, and 11b may be set as an inverse pulse signal, which are stored in the first register 212.

As illustrated in FIG. 23, when ' . . . 11010101b' is stored in advance at an address [0] in the codebook table 211, 2 bits of each of binary numbers of [01], [01], [01], and may be applied to the driving electrodes Tx0, Tx1, Tx2, and Tx3 in an order from the back thereof.

Accordingly, a pulse, a pulse, a pulse, and a reverse pulse are applied as matched and set to the first register 212 that is the codebook register, and a waveform illustrated at an upper end of FIG. 23 is output to each time slot of the driving electrodes Tx0, Tx1, Tx2, and Tx3.

On the other hand, in FIG. 21, the first register 212 receives a plurality of addresses and data matched with the respective addresses from the codebook table 211 and temporarily stores the addresses and data.

The DMA (direct memory access) 213 receives necessary data by directly accessing the first register 212 from a peripheral device instead of being processed by the built-in processor 221.

The driving signal generation part 214 receives a plurality of codes stored in advance according to each scan mode from the codebook table 211 and generates a driving signal (or Tx signal) to output the generated driving signal to the driving electrode (Tx electrode) of the touch sensor 150.

For example, when it is assumed that 2 bits are allocated to each of a plurality of driving electrode channels, the driving signal may include a low level signal, a pulse signal, a high level signal, and a reverse pulse signal.

The plurality of sensing sensors 215 sense a touch of a user through the plurality of receiving electrodes and output a sensing signal.

The processor 221 sets the start codebook address when scanning is performed according to the scan mode through the built-in firmware and programs each code with a combination of predetermined bits. Also, whenever the first register 212 is controlled, the corresponding code may be read and written in the codebook table 211.

For example, whenever the touch driving is performed, a corresponding code is read from the codebook table 211, and the codebook address automatically increases for each time slot.

The codebook table 211 may store various kinds of codes in advance according to the scan mode and set the start codebook address when the scanning is performed.

The external serial interface (ESI) 222 is an input/output interface that transmits data calculated by the processor 221 to a host and receives data from the host to transmit the received data to the processor 221.

The general-purpose input/output part (GPIO) 223 has an input or output operation controlled by the user during a runtime.

The second register 224 temporarily stores data input or output through the general input/output part 223.

Through this, the present invention may recognize an address to be started for each scan according to each scan mode to perform various operations according to information on the driving signal matched with and stored at the address and control the driving signals performed at the same time regardless of the number of driving signals.

As described above, the present invention may perform various touch sensings using the single touch controller by storing various code values in advance in the codebook according to the touch scan mode in the touch input device.

Accordingly, the touch driving time and sensing time of the touch input device may be reduced without performing additional firmware calculations whenever the code change is required or whenever the touch input device performs the touch driving.

Particularly, since the central processing unit may perform other important operations during the code change, the operation efficiency of the central processing unit may increase, the power consumption may be saved, and the decrease phenomenon of the reporting rate may be prevented.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch input device comprising:
a display panel comprising a plurality of scan lines;
a touch sensor comprising a plurality of driving electrodes and a plurality of receiving electrodes arranged in a direction perpendicular to the plurality of driving electrodes; and
a touch controller configured to store a plurality of codes in advance and output a predetermined code among the plurality of codes to the plurality of driving electrodes according to a touch scan,
wherein each of the driving electrodes includes a pair of driving electrode patterns, wherein the pair of driving electrode patterns includes a first driving electrode pattern arranged directly adjacent to a first receiving electrode of the plurality of receiving electrodes, and a second driving electrode pattern not directly adjacent to the first receiving electrode and spaced apart from the first receiving electrode by a predetermined distance,
wherein the touch controller is configured to simultaneously apply a first and second driving signals corresponding to the predetermined code to the first driving electrode pattern and the second driving electrode pattern, and
wherein the first driving signal applied to the first driving electrode pattern has the same magnitude as the second driving signal applied to the second driving electrode pattern and is phase-inverted by 180 degrees.

2. The touch input device of claim 1, wherein the touch controller comprises:
a control unit configured to perform the touch scan so that driving signals are applied to two or more driving electrodes of the plurality of driving electrodes; and
a driving and sensing unit configured to match the predetermined code with the at least two driving electrodes in response to control of the control unit according to the touch scan and output the matched predetermined code.

3. The touch input device of claim 2, wherein the driving and sensing unit comprises:
a codebook table configured to match the plurality of codes programmed by the built-in firmware in the control unit with the plurality of addresses, respectively, and store the plurality of matched codes;
a driving signal generation part configured to receive the plurality of stored codes according to a scan mode to generate a driving signal and output the generated driving signal to the plurality of driving electrodes; and a plurality of sensing sensors configured to receive a sensing signal output from the plurality of receiving electrodes.

4. The touch input device of claim 3, wherein the driving and sensing unit further comprises a first register configured to receive the plurality of addresses and data matched with the respective addresses from the codebook table and temporarily store the received addresses and data.

5. The touch input device of claim 2, wherein the control unit comprises:

a processor configured to set a start codebook address when scanning is performed according to a scan mode through the firmware and program the plurality of codes;

an external serial interface configured to transmit data calculated by the processor to a host; and a second register configured to temporarily store data input or output through a general-purpose input/output part.

6. The touch input device of claim 2, wherein the control unit sequentially performs the touch scan multiple times on all of the plurality of driving electrodes.

7. The touch input device of claim 2, wherein each of the driving signals is obtained by continuing a vector value expressed by at least one of −1, 0, and 1 for each predetermined time period as many as the number of the driving electrodes.

8. The touch input device of claim 3, wherein the processor reads a corresponding code from the codebook table whenever the driving and sensing unit performs a touch driving and increases a codebook address for each time slot.

9. The touch input device of claim 1, further comprising:

a gate driving circuit configured to sequentially output display scan signals to the plurality of scan lines to control a driving timing of a plurality of subpixels;

a data driving circuit configured to receive image data and convert the image data into an analog data voltage; and a display control unit configured to transmit the image data and control the gate driving circuit and the data driving circuit.

10. The touch input device of claim 4, wherein the display panel further comprises a plurality of data lines arranged in a direction perpendicular to the plurality of scan lines, and the plurality of subpixels are disposed on an area in which the plurality of scan lines cross the plurality of data lines.

11. The touch input device of claim 4, wherein the data driving circuit outputs a data voltage to each of the plurality of data lines in accordance with a timing at which a scan signal is applied through the plurality of scan lines and controls each of the plurality of subpixels to display brightness according to the image data.

12. The touch input device of claim 3, wherein the codebook table is a table in which code vectors for encoding and decoding of data stored in an internal or external memory or register of the touch controller.

13. The touch input device of claim 1, wherein the plurality of driving electrodes is arranged in a direction perpendicular to the plurality of receiving electrodes.

* * * * *